United States Patent
Mathy et al.

(10) Patent No.: US 11,423,572 B2
(45) Date of Patent: Aug. 23, 2022

(54) BUILT-IN CALIBRATION OF TIME-OF-FLIGHT DEPTH IMAGING SYSTEMS

(71) Applicant: Analog Devices, Inc., Norwood, MA (US)

(72) Inventors: Charles Mathy, Arlington, MA (US); Brian C. Donnelly, Sudbury, MA (US); Nicolas Le Dortz, Cambridge, MA (US); Sefa Demirtas, Winchester, MA (US)

(73) Assignee: ANALOG DEVICES, INC., Wilmington, MA (US)

(*) Notice: Subject to any disclaimer, the term of this patent is extended or adjusted under 35 U.S.C. 154(b) by 458 days.

(21) Appl. No.: 16/664,453

(22) Filed: Oct. 25, 2019

(65) Prior Publication Data

US 2020/0193640 A1 Jun. 18, 2020

Related U.S. Application Data

(60) Provisional application No. 62/778,876, filed on Dec. 12, 2018.

(51) Int. Cl.
*G06K 9/00* (2022.01)
*G06T 7/80* (2017.01)
(Continued)

(52) U.S. Cl.
CPC ............... *G06T 7/80* (2017.01); *G01S 7/497* (2013.01); *G01S 17/89* (2013.01); *G06T 2207/10028* (2013.01)

(58) Field of Classification Search
CPC ............ G06T 7/80; G06T 2207/10028; G06T 2207/10048; G01S 7/497; G01S 17/89;
(Continued)

(56) References Cited

U.S. PATENT DOCUMENTS 7,920,982 B2 4/2011 Williams et al.
8,274,037 B2* 9/2012 Ritter .................. G01J 1/46
250/214 R (Continued)

FOREIGN PATENT DOCUMENTS

DE 102018119435 A1 * 2/2020 ............. G01C 11/06
EP E P-2587215 A2 * 5/2013 ............. G01C 11/06
(Continued)

OTHER PUBLICATIONS

English Abstract to correspond with foreign reference JP2018-194484, 1 page.
(Continued)

*Primary Examiner* — Mahendra R Patel

(57) ABSTRACT

An image processing system having on-the-fly calibration uses the placement of the imaging sensor and the light source for calibration. The placement of the imaging sensor and light source with respect to each other affect the amount of signal received by a pixel as a function of distance to a selected object. For example, an obstruction can block the light emitter, and as the obstruction is positioned an increasing distance away from the light emitter, the signal level increases as light rays leave the light emitters, bounce off the obstruction and are received by the imaging sensor. The system includes a light source configured to emit light, and an image sensor to collect incoming signals including reflected light, and a processor to determine a distance measurement at each of the pixels and calibrate the system.

20 Claims, 23 Drawing Sheets

(51) Int. Cl.
*G01S 7/497* (2006.01)
*G01S 17/89* (2020.01)

(58) Field of Classification Search
CPC .... G01S 7/4815; G01S 7/4863; G01S 7/4865; G01S 17/10; G01S 17/894
USPC ........................................................ 382/106
See application file for complete search history.

(56) References Cited

U.S. PATENT DOCUMENTS

| | | | | |
|---|---|---|---|---|
| 9,270,974 | B2* | 2/2016 | Zhang | H04N 13/207 |
| 9,335,220 | B2 | 5/2016 | Shpunt et al. | |
| 9,681,123 | B2* | 6/2017 | Perry | G01S 7/4915 |
| 9,846,960 | B2 | 12/2017 | Kirk et al. | |
| 10,139,341 | B2* | 11/2018 | Cook | G01N 21/59 |
| 2004/0246493 | A1* | 12/2004 | Kim | G01B 11/0625 |
| | | | | 356/504 |
| 2011/0018973 | A1* | 1/2011 | Takayama | H04N 5/232121 |
| | | | | 348/47 |
| 2013/0107037 | A1* | 5/2013 | Kumagai | G01C 15/002 |
| | | | | 348/135 |
| 2015/0153453 | A1* | 6/2015 | Kane | G01S 17/42 |
| | | | | 356/5.01 |
| 2017/0307759 | A1 | 10/2017 | Pei et al. | |
| 2018/0096489 | A1* | 4/2018 | Cohen | G01S 17/89 |
| 2020/0033113 | A1* | 1/2020 | Slettemoen | G06T 7/521 |

FOREIGN PATENT DOCUMENTS

| | | | | |
|---|---|---|---|---|
| JP | 61-270683 | | 11/1986 | |
| JP | 2013-092456 | | 5/2013 | |
| JP | 2014-153288 | | 8/2014 | |
| JP | 2014153288 | A * | 8/2014 | |
| JP | 2018-194484 | | 12/2018 | |
| JP | 2018194484 | A * | 12/2018 | |
| WO | WO-2004055544 | A1 * | 7/2004 | ............. G01S 17/89 |
| WO | WO-2014018836 | A1 * | 1/2014 | ........... G06K 9/2018 |
| WO | WO-2018091970 | A1 * | 5/2018 | ........... G01S 17/931 |

OTHER PUBLICATIONS

English Abstract to correspond with foreign reference JP61-270683,1 page.
English Abstract to correspond with foreign reference JP2014-153288, 1 page.

* cited by examiner

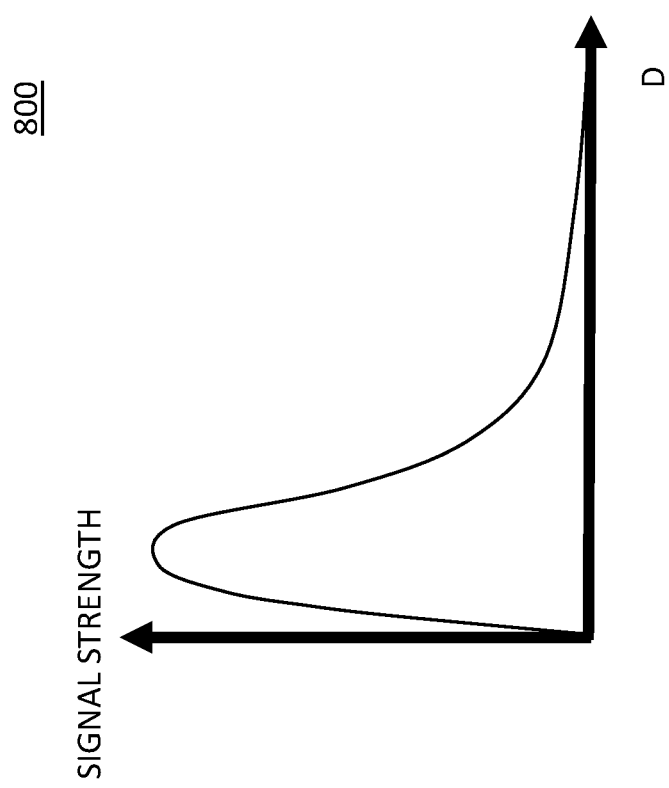

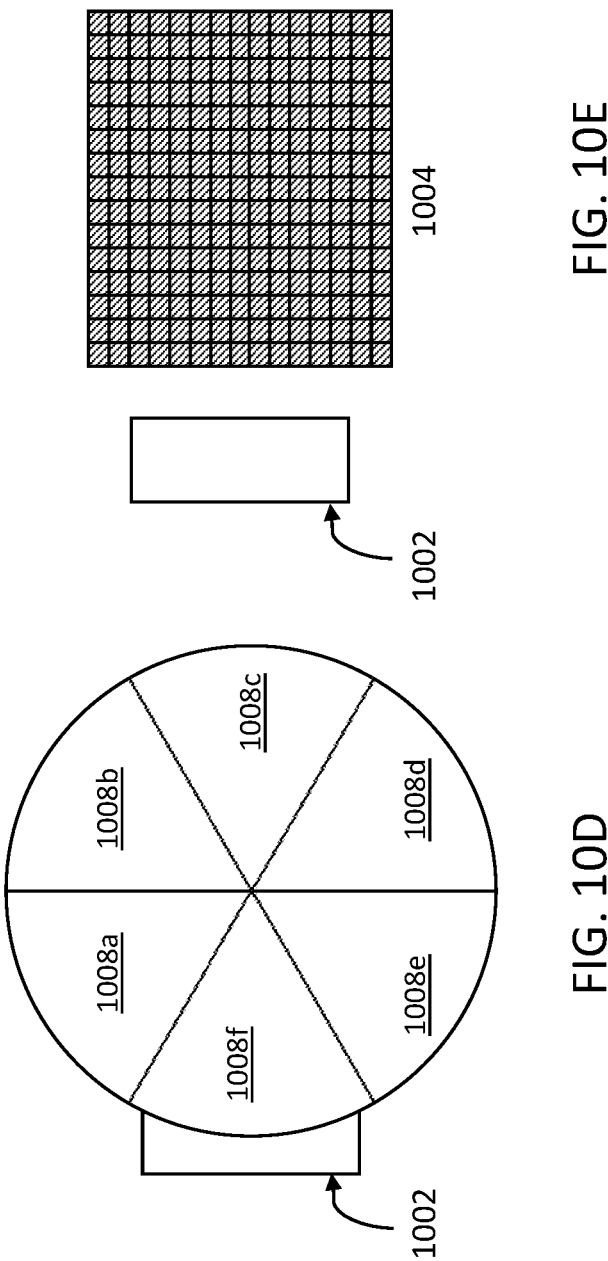

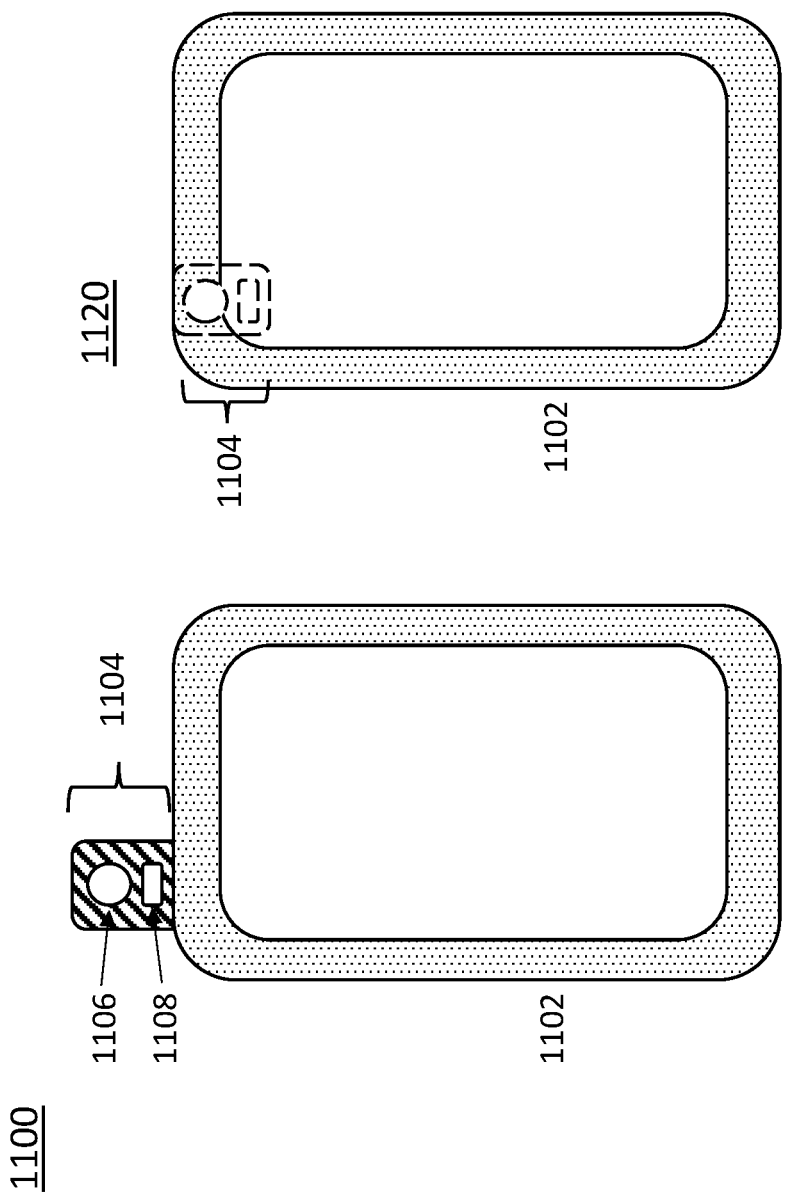

BUILT-IN CALIBRATION OF TIME-OF-FLIGHT DEPTH IMAGING SYSTEMS

FIELD OF THE DISCLOSURE

The present disclosure pertains to time of flight (ToF) depth imaging. More specifically, this disclosure describes systems and techniques relating to calibration of time-of-flight depth sensors.

BACKGROUND

Time of flight (ToF) is a property of an object, particle or acoustic, electromagnetic or other wave. It is the time that such an object needs to travel a distance through a medium. The measurement of this time (i.e. the time of flight) can be used for a time standard (such as an atomic fountain), as a way to measure velocity or path length through a given medium, or as a way to learn about the particle or medium (such as composition or flow rate). The traveling object may be detected directly (e.g., ion detector in mass spectrometry) or indirectly (e.g., light scattered from an object in laser doppler velocimetry).

The Time-of-Flight principle (ToF) is a method for measuring the distance between a sensor and an object based on the time difference between the emission of a signal and its return to the sensor after being reflected by an object. Various types of signals (also called carriers) can be used with ToF, the most common being sound and light. Some sensors use light as their carrier because it is uniquely able to combine speed, range, low weight and eye-safety. Infrared light can ensure less signal disturbance and easier distinction from natural ambient light resulting in the higher performing sensors for a given size and weight.

A time-of-flight camera (ToF camera) is a range imaging camera system that resolves distance based on the known speed of light, measuring the time-of-flight of a light signal between the camera and the subject for each point of the image.

In time-of-flight (TOF) image sensors, the image sensor captures a two-dimensional image, or several two-dimensional images, from which a processor can determine the distance to objects in the scene. The TOF image sensor is further equipped with a light source that illuminates objects whose distances from the device are to be measured by detecting the time it takes the emitted light to return to the image sensor. The system may also utilize image processing techniques.

This overview is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

SUMMARY OF THE DISCLOSURE

Systems and methods for Time of Flight (ToF) depth image processing are disclosed. According to one aspect, systems and methods for on-the-fly calibration are disclosed. In particular, systems and methods are disclosed for considering the placement of the imaging sensor and the light source with respect to an obstruction in processing a received signal. In one example, the placement of the imaging sensor and light source with respect to each other affect the amount of signal received by a pixel as a function of distance to a selected object or obstruction. For example, an obstruction can block the light emitter, and as the obstruction is positioned an increasing distance away from the light emitter, the signal level increases as light rays leave the light emitters, bounce off the obstruction and are received by the imaging sensor.

In some implementations light emitters emit light over a solid angle which is tunable, for example by placing a diffuser and/or aperture in front of the light emitters.

According to one aspect, an image processing system having on-the-fly calibration includes a light source configured to emit light during a first time interval, an image sensor for collecting incoming signals including reflected light comprising a plurality of pixels, wherein for each of the plurality of pixels, the image sensor includes a set of storage units for storing collected signals, and a processor configured to utilize stored collected signals from the storage units and determine a distance measurement at each of the plurality of pixels. The processor is further configured to use a first subset of storage units from the set of pixels to calibrate the system. In one implementation, the first subset of storage units correlate to a subset of pixels that receive less than a saturation amount of reflected light.

According to another aspect, a method for calibrating an image processing system includes emitting light during a first time interval, collecting incoming signals including reflected emitted light, determining a depth estimate for a plurality of pixels from unfiltered collected incoming signals, and calibrating the system using a subset of the plurality of pixels. In one implementation, calibrating the system comprises using a subset of pixels that receive less than a saturation amount of reflected light, and more than a minimum amount of reflected light.

According to one aspect, an image processing system having on-the-fly calibration includes a light source configured to emit light, a sensor array comprising a plurality of pixels for receiving incoming signals including reflected emitted light, an obstruction positioned at a predetermined distance from the light source, configured to reflect at least a portion of the emitted light from the light source to at least a subset of the pixels in the sensor array, and a processor configured to determine a distance measurement for at least one of the pixels in the subset of pixels and calibrate the image processing system.

In some implementations, for each of the plurality of pixels, the sensor array includes a storage unit for storing collected received incoming signals. In some examples, a first subset of the storage units corresponds to the subset of the pixels, and wherein the first subset of storage units stores collected signals comprising emitted light reflected off the obstruction.

In some implementations, the processor is further configured to use the predetermined distance of the obstruction to calibrate the system. In some implementations, the obstruction is mobile. In some examples, the obstruction is a shutter configurable to cover the light emitters and the sensor array.

In some implementations, the predetermined distance is less than about ten millimeters. In various examples, the predetermined distance is about eight millimeters, less than about eight millimeters, about six millimeters, less than about six millimeters, about five millimeters, less than about five millimeters, about four millimeters, less than about four millimeters, about three millimeters, less than about three millimeters, about two millimeters, less than about two millimeters, about one millimeter, or less than about one millimeter. In other implementations, the predetermined distance is about ten millimeters or more than about ten millimeters.

In some implementations, the image processing system includes a light block positioned between the light source and the sensor array. The light block is configured to prevent emitted light from travelling directly to the sensor array.

In some implementations, the subset of pixels in the sensor array receive less than a saturation amount of reflected light. In some implementations, the light source emits light over a tunable solid angle. In some implementations, the image processing system includes a diffuser configured for moveable placement in front of the light emitters.

According to one aspect, a method for calibrating an image processing system includes emitting light from a light source, receiving reflected emitted light at a sensor array having a plurality of pixels, collecting and storing incoming signals at the pixels in a corresponding plurality of storage units, determining a depth measurement for at least a subset of the plurality of pixels from signals stored in a corresponding subset of the storage units, and calibrating the system using the depth measurement. Receiving reflected emitted light comprises receiving emitted light reflected off an integrated obstruction positioned at a predetermined distance from the light source.

In some implementations, calibrating the system includes comparing the depth measurement with the predetermined distance. In some implementations, calibrating the system comprises using the subset of storage units that receive less than a saturation amount of reflected light. In some implementations, emitting light includes emitting light over a tunable solid angle.

In some implementations, receiving emitted light reflected off an integrated obstruction includes receiving emitted light reflected off a moveable shutter when the shutter is in a first position. In some examples, the method includes disposing an adjustable aperture in the shutter in front of the light source.

According to various examples, the shutter includes a plurality of shutter positions. In a subset of shutter positions, the shutter defines an aperture, and the aperture size varies depending on the particular shutter position. In one shutter position, the shutter is closed and includes no aperture.

According to another aspect, an image processing system having on-the-fly calibration includes a light source configured to emit light, a sensor array comprising a plurality of pixels for receiving incoming signals including reflected emitted light, wherein for each of the plurality of pixels, the sensor array includes a storage unit for storing collected received incoming signals, and a processor configured to calibrate the image processing system using stored collected signals from at least a subset of the storage units, wherein the processor determines a distance measurement for at least one of the plurality of pixels.

In some implementations, the image processing system includes a diffuser configured for moveable placement in front of the light emitters. In some implementations, the image processing system includes a light block positioned between the light source and the sensor array, wherein the light block is configured to prevent emitted light from travelling directly to the sensor array.

The drawings show exemplary ToF circuits, systems and configurations. Variations of these systems, for example, changing the positions of, adding, or removing certain elements from the circuits are not beyond the scope of the present invention. The illustrated ToF devices and configurations are intended to be complementary to the support found in the detailed description.

BRIEF DESCRIPTION OF THE DRAWINGS

For a fuller understanding of the nature and advantages of the present invention, reference is made to the following detailed description of preferred embodiments and in connection with the accompanying drawings, in which:

FIGS. 8A-8B show an imaging system and a signal strength curve, according to some embodiments of the disclosure;

FIGS. 10A-10E show an imaging system having a shutter, according to some embodiments of the disclosure;

FIGS. 11A-11B show a pop-up system for an imaging system, according to some embodiments of the disclosure;

DETAILED DESCRIPTION

Time-of-flight depth imagers create images of the distance to objects in the scene, by emitting light close to the imager and measuring the time it takes for the light to reflect off objects and return to the imager. To accurately determine distance, time-of-flight depth imagers are calibrated. Traditionally, systems are calibrated at the time of manufacture using an object that is not a part of the system, and placing the object a predetermined distance from the imager.

Various systems and methods are described herein for on-the-fly calibration. On-the-fly calibration can be implemented spontaneously. In some examples, on-the-fly calibration is performed at the time of manufacture. In some examples, on-the-fly calibration is performed after manufacture. In some examples, an imager that include on-the-fly calibration can be re-calibrated at any time. On-the-fly calibration components are included integrally in the imaging system that includes on-the-fly calibration.

According to various implementations, the systems and methods described herein use measurements of the placement of the imaging sensor and light source with respect to each other. In particular, the amount of signal received by a pixel as a function of distance to a given object depends on the placement of the imaging sensor and light source with respect to each other. In some implementations, on-the-fly calibration systems include an integrated obstruction a short known distance from the light source, and light emitted from a light source is reflected off the obstruction and received at the sensor array. Light received at the sensor array is used to calibrate the system. In various implementations, any number of cameras can be calibrated simultaneously. Additionally, the self-calibrating system can be constructed from relatively inexpensive parts. The self-calibrating system as described herein does not require expensive optics.

Figure 1:
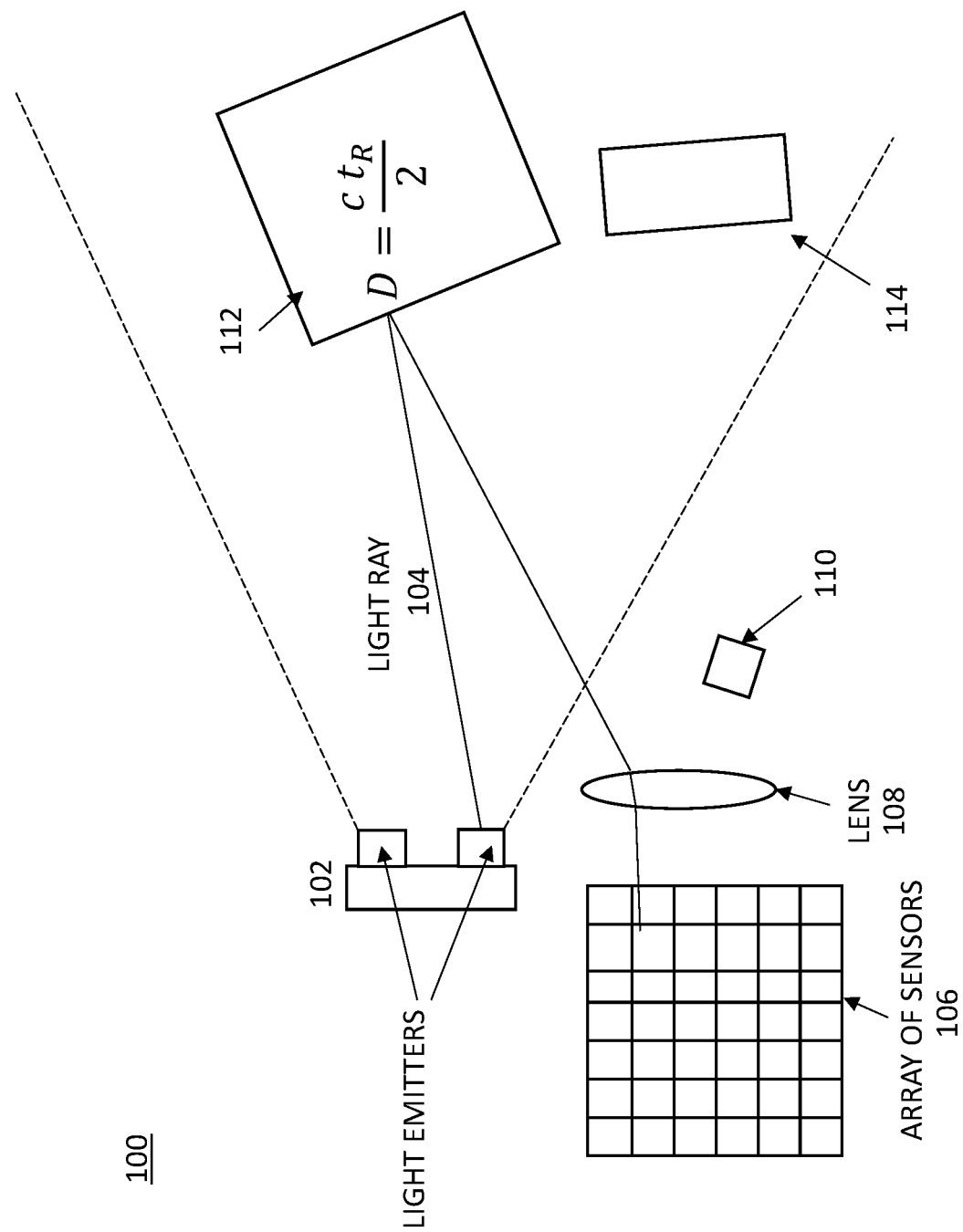
FIG. 1 shows a time-of-flight depth imaging system 100, according to some embodiments of the disclosure.

FIG. 1 shows a time-of-flight depth imaging system 100, according to some implementations of the disclosure. The imaging system 100 includes light emitters 102, light rays 104, an array of sensors 106, and a lens 108. As shown in FIG. 1, a light ray 104 reflects off an object 112. The array of light-receiving pixels 106 each convert the number of photons that arrive while the pixel is on to a number that is stored in one of a number of storage units. Once the time $t_R$ it takes for light to leave the light source and return to the imager is estimated, the depth is given by equation (1)

$$D = \frac{ct_R}{2} \quad (1)$$

where c is the speed of light.

Figure 2:
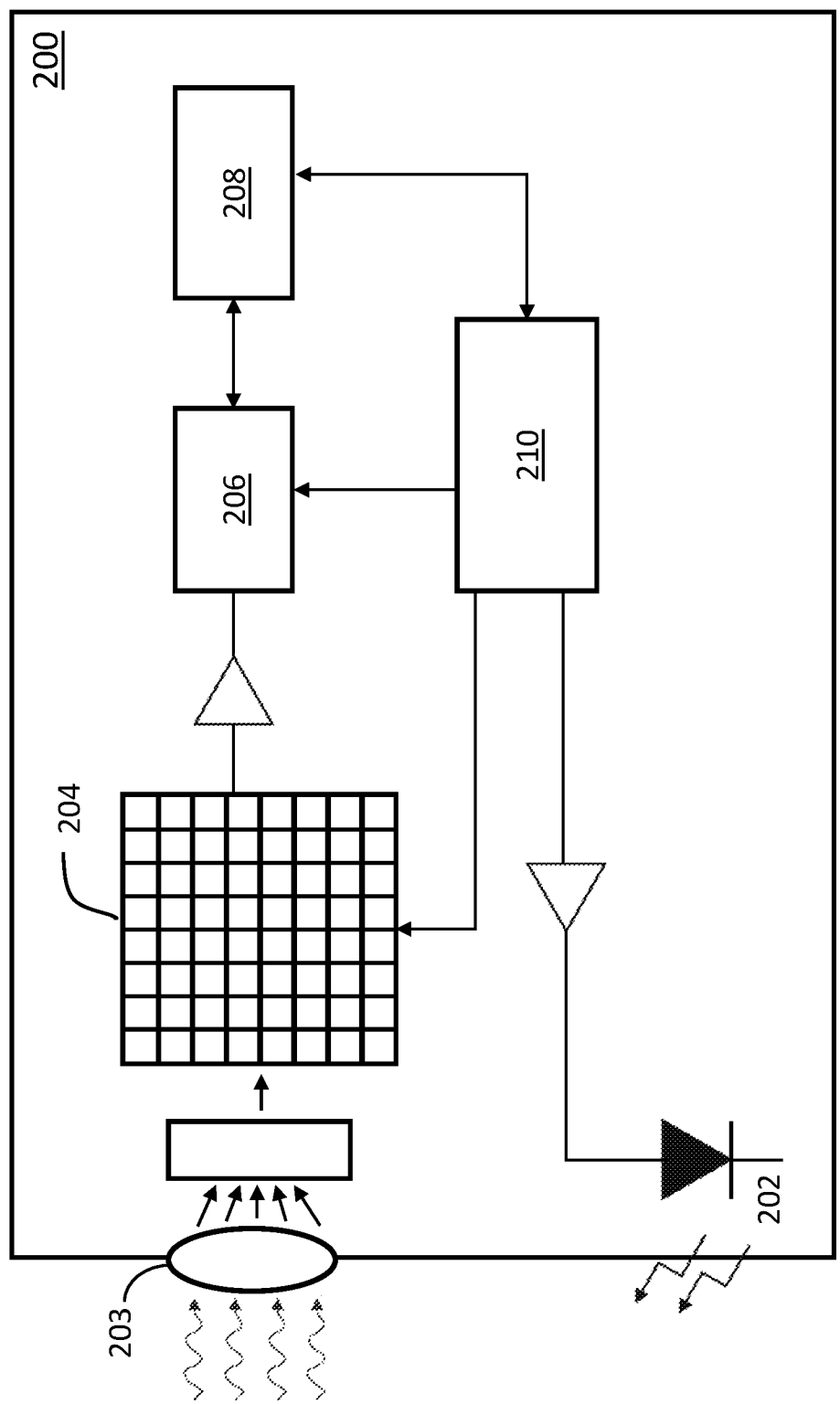
FIG. 2 shows an imaging device, according to some embodiments of the disclosure.

FIG. 2 shows an imaging device 200, according to some embodiments of the disclosure. In one implementation, the imaging device 200 is a depth imager. An illumination light source 202 emits light, which reflects off objects in the scene. In some examples, the light frequency is an infrared frequency to reduce the contribution from sunlight. Some of the reflected light enters the lens 203 in front of the image sensor 204. A timing generator 210 sends signals to the light source which controls the amount of light being emitted. A depth imager sends signals that determine the intensity of the light emitters, and the sensitivity of the light-receiving sensors at each pixel. The timing generator 210 also sends signals to the image sensor 204. The signals to the image sensor 204 from the timing generator 210 are used to determine the sensitivity of the image sensor 204. The sensitivity of the image sensor 204 dictates how much charge the sensor 204 generates per unit of incoming light. In particular, the sensor 204 has a set of charge storage units at each pixel and as it collects signal it can add that signal to one of its storage units. A measurement obtained by controlling the light emitters and sensor sensitivity can be added to one of the storage units. For example, a storage unit may be a capacitor and a measurement add electrons to the electrons already stored in the capacitor. Thus, signals can in some cases be added together directly in each storage unit. A front end 206 reads out the contents of each storage unit and converts them to a number. A processor 208 performs the computations on the storage units that lead to a distance measurement at each pixel.

Figure 3:
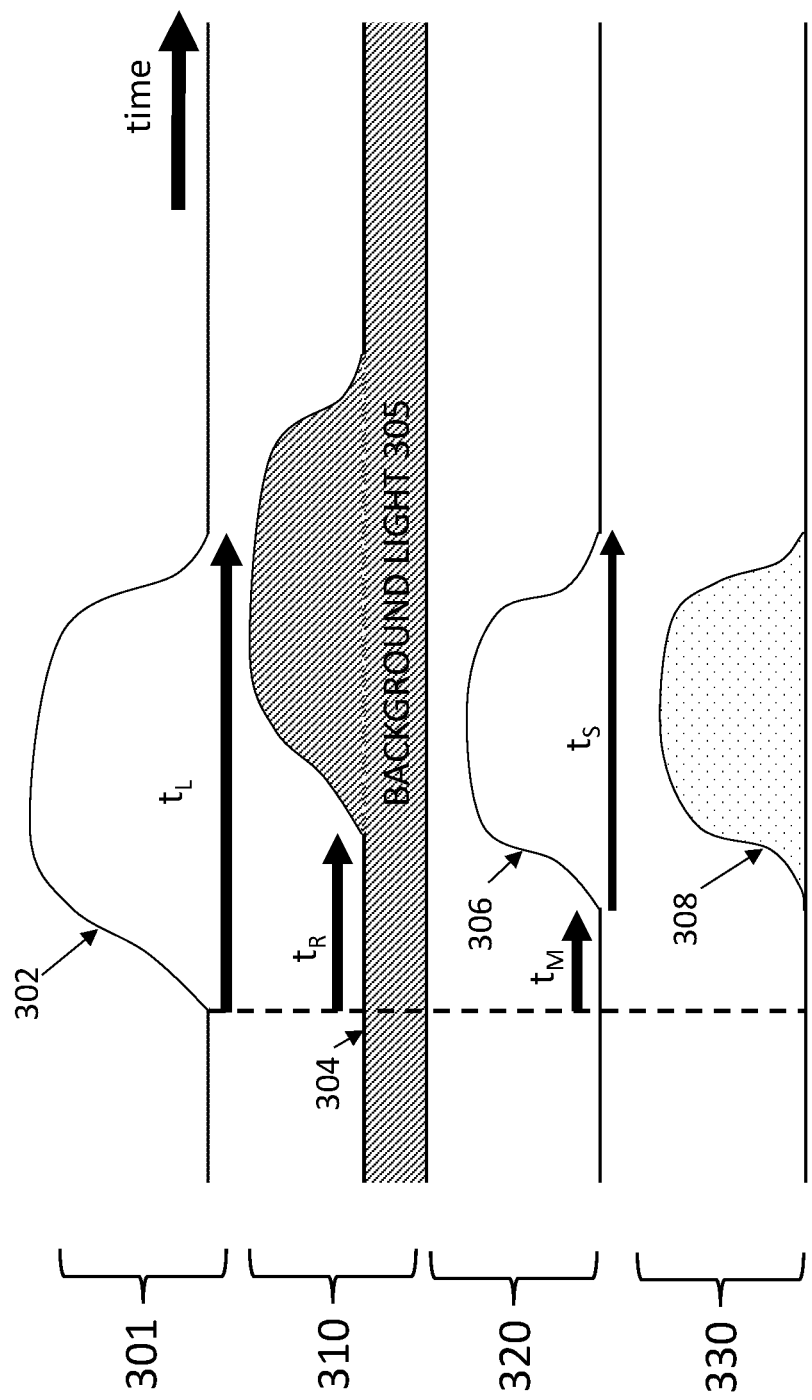
FIG. 3 shows a measurement of the collected signal, according to some embodiments of the disclosure.

In FIG. 3 an exemplary measurement is depicted. In particular, FIG. 3 shows four graphs with the same time measurement on the x-axis. The time during which the light emitters are on, the light pulse, is t=0 to $t_L$, where t=0 is the time when the light source is turned on and is indicated by the vertical dashed line. The top graph 301 shows the emitted light 302. The intensity of the light source over time $f_{P_L}(t)$ depends on a set of parameters $P_L$. $P_L$ may include the temperature $T_L$ of the light source, the duration of the light pulse $t_L$, and other parameters such as the length of the electrical connections to the light source, and the voltage to the light source.

The second graph 310 shows the light arriving at the sensor. The light 304 arriving at the sensor includes background light 305 as well as reflected emitted light from the light pulse shown in the first graph 301.

The third graph 320 shows sensor sensitivity. The sensor is turned on from time $t=t_M$ to $t_M+t_S$ where M stands for "measurement" and $t_S$ is the total amount of time during which the sensor is collecting light. The photosensitivity of the sensor over time 306 is: $g_{P_S}(t-t_M)$. When the photosensitivity of the sensor over time 306 is multiplied by the number of photons hitting the sensor per unit of time, the result is the contribution to the output of the sensor.

The sensor parameters $P_S$ include the total amount of time during which the sensor is collecting light ($t_S$), and may include the temperature $T_S$ of the sensor, as well as other parameters such as the temperature of the signal generator. Any of the parameters may depend on time. The light from the light source hitting the object and returning to the sensor will be delayed by some time $t_R$. The time $t_R$ is one quantity to be estimated in calibrating the system.

Referring back to the second graph 310, the return light will also have an amplitude a which depends on the reflectivity of the object, and may have background light added to it, for example from sunlight reflecting off the object, or some other light source. The sensor can be chosen to have sensitivity only at some frequencies of light. In one example, a bandpass filter is placed in front of the sensor to reduce the amount of background light. The light hitting the sensor over time, shown in graph 310, will have the functional form a $f_{P_L}(t-t_R)+b$, where b is the background light 305.

The fourth graph 330 shows the overall collected signal. The overall signal collected $M_{P_M}(t_R, a, b)$ will be a function of the light hitting the sensor over time and the sensitivity of the sensor, and it will vary depending on the parameters discussed above. The parameters $P_M$ include the parameters the sensor and light emitters depend on such as temperature parameters $T_L$ and $T_S$ and the time parameters $t_L$ and $t_S$ discussed above. Additionally, $P_M$ includes the number of repetitions N of the measurement to increase the signal level. In particular, $P_M = \{N, P_L, P_S, \ldots\}$. $P_M$ further includes any additional parameters that affect the final measurement. For example, if the sensor response is linear, then the measurement is given in equation (2):

$$M_{P_M, t_M}(t_R, a, b) = \sum_{n=1}^{N} \int (a\ f_{P_L}(t-t_R) + b) g_{P_S}(t-t_M) dt \quad (2)$$

Figure 4:
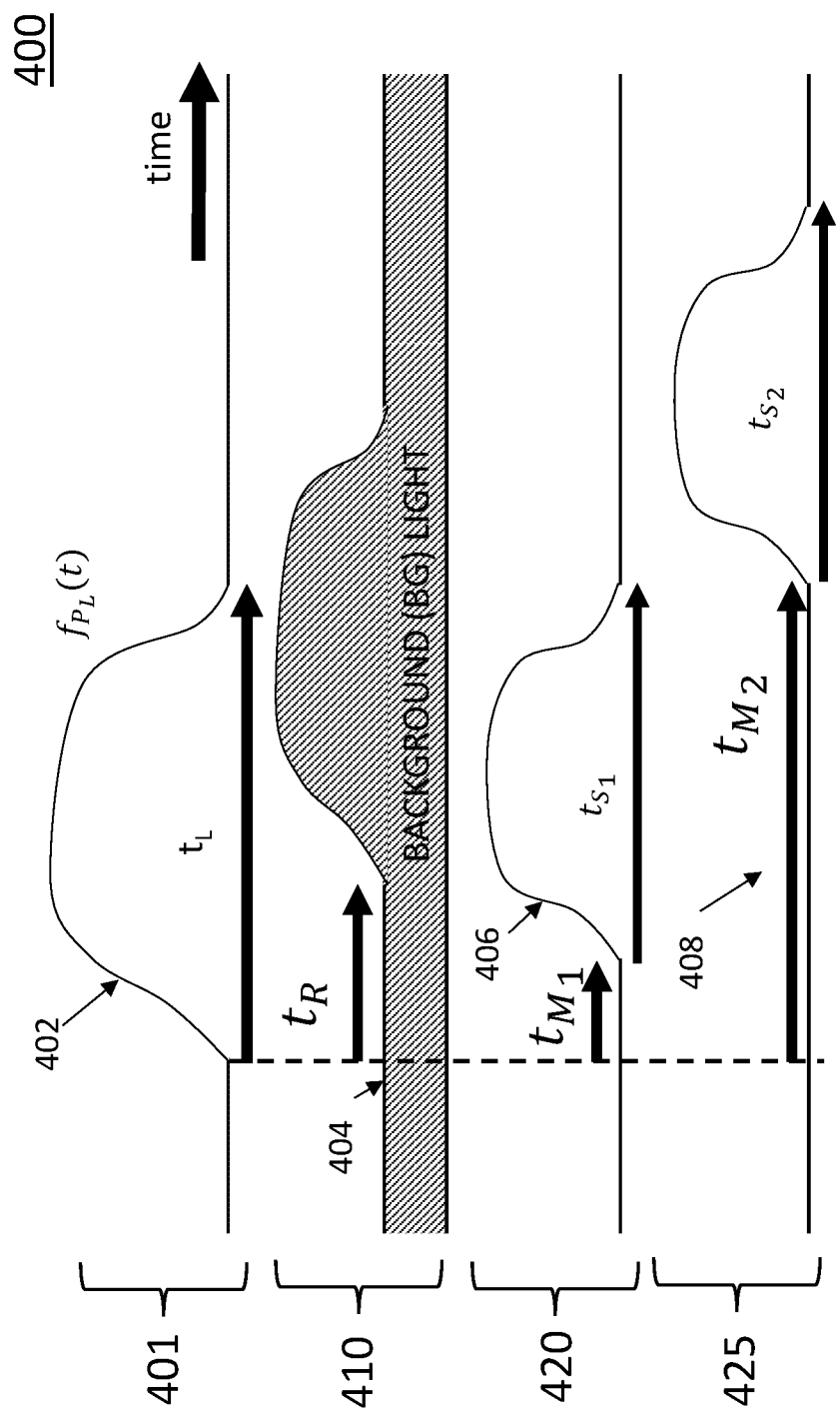
FIG. 4 shows a system collecting measurements in more than one storage unit, according to some embodiments of the disclosure.

In some implementations, the system may switch which storage unit is collecting light of a single light pulse. FIG. 4 shows a system 400 collecting measurements in more than one storage unit, according to some embodiments of the disclosure. In FIG. 4, the first graph 401 shows the light pulse 402 of the emitted light. The second graph 410 shows the light 404 at the sensor. The third graph 420 shows the collected light at a first storage unit. The fourth graph 425 shows the collected light at a second storage unit. Having multiple storage units for collecting measurements results in a power saving, as light is only emitted once for several measurements.

In some implementations, when several measurements are collected, the measurements can be combined in a way such that the result is not dependent on a or b. In particular, a collected light quantity F(D) can be determined, where $$D = \frac{ct_R}{2}. \quad F(D)$$

depends monotonically on D, such that two different values of D give a different value of F(D) for a range of depth values. Independence from a and b assures that the depth to the object does not depend on the reflectivity of the object, nor on the background light. One example of such a scheme involves three measurements per pixel:

$$M_{P_M, t_{M_0}}, M_{P_M, t_{M_1}}, M_{P_M, t_{M_2}}$$

where $t_S = t_L$, $t_{M_0} = -t_S$, $t_{M_1} = 0$, $t_{M_2} = t_S$. Here $$M_{P_M, t_{M_0}}$$

is a measurement proportional to background, $$M_{P_M, t_{M_1}}$$

measures the return light during the time that the light source is on, and $$M_{P_M, t_{M_2}}$$

measures the amount of light hitting the sensor between times $t_S$ and $2t_S$. The repetition amount of each measurement can be different. When $N_i$ is the number of repetitions for measurement $$M_{P_M, t_{M_i}},$$

then F(D) is represented by the equation:

$$F(D) = \frac{M_{P_M, t_{M_2}} - \frac{N_2}{N_0} M_{P_M, t_{M_0}}}{M_{P_M, t_{M_2}} - \frac{N_2}{N_0} M_{P_M, t_{M_0}} + \frac{N_2}{N_1} M_{P_M, t_{M_1}} - \frac{N_2}{N_0} M_{P_M, t_{M_0}}}$$

Figure 5:
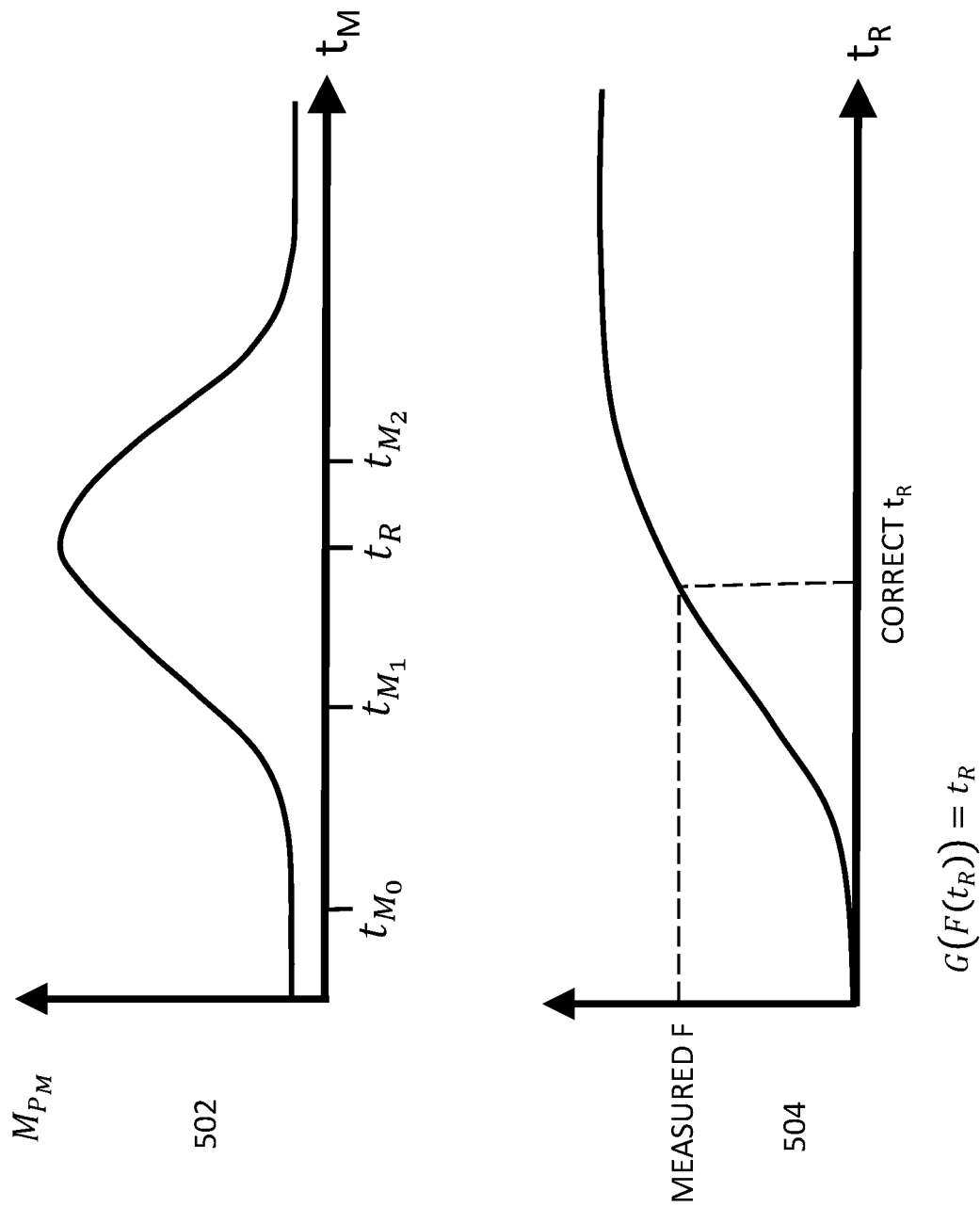
FIG. 5 shows measurements and a look-up table, according to some embodiments of the disclosure.

F(D) as shown above does not depend on b because the background light is subtracted. Similarly, F(D) does not depend on a as both the numerator and denominator are proportional to a. If $F_M(D)$ is a function with a single maximum as a function of D, and the measurements $t_{M_2}$ and $t_{M_1}$ are on opposite sides of the maximum, then $F_{P_M}(D)$ is monotonic for the depth range within which $t_{M_2}$ and $t_{M_1}$ remain on opposite sides of the maximum. Therefore, the calculation of $F_{P_M}(D)$ makes it possible to obtain $t_R$ by inverting the function $F_{P_M}$. The function $F_{P_M}(D)$ can be stored as a lookup table and used to obtain depth estimates. In one example, the inverse function $G_{P_M}$ is stored, such that $G_{P_M}(F_{P_M}(D)) = D$. The measurements and lookup table are depicted in FIG. 5. In particular, referring to FIG. 5, equation (3):

$$F(t_R) = \frac{M_{P_M, t_{M_2}} - \frac{N_2}{N_0} M_{P_M, t_{M_0}}}{M_{P_M, t_{M_2}} - \frac{N_2}{N_0} M_{P_M, t_{M_0}} + \frac{N_2}{N_1} M_{P_M, t_{M_1}} - \frac{N_2}{N_0} M_{P_M, t_{M_0}}}$$

Figure 6:
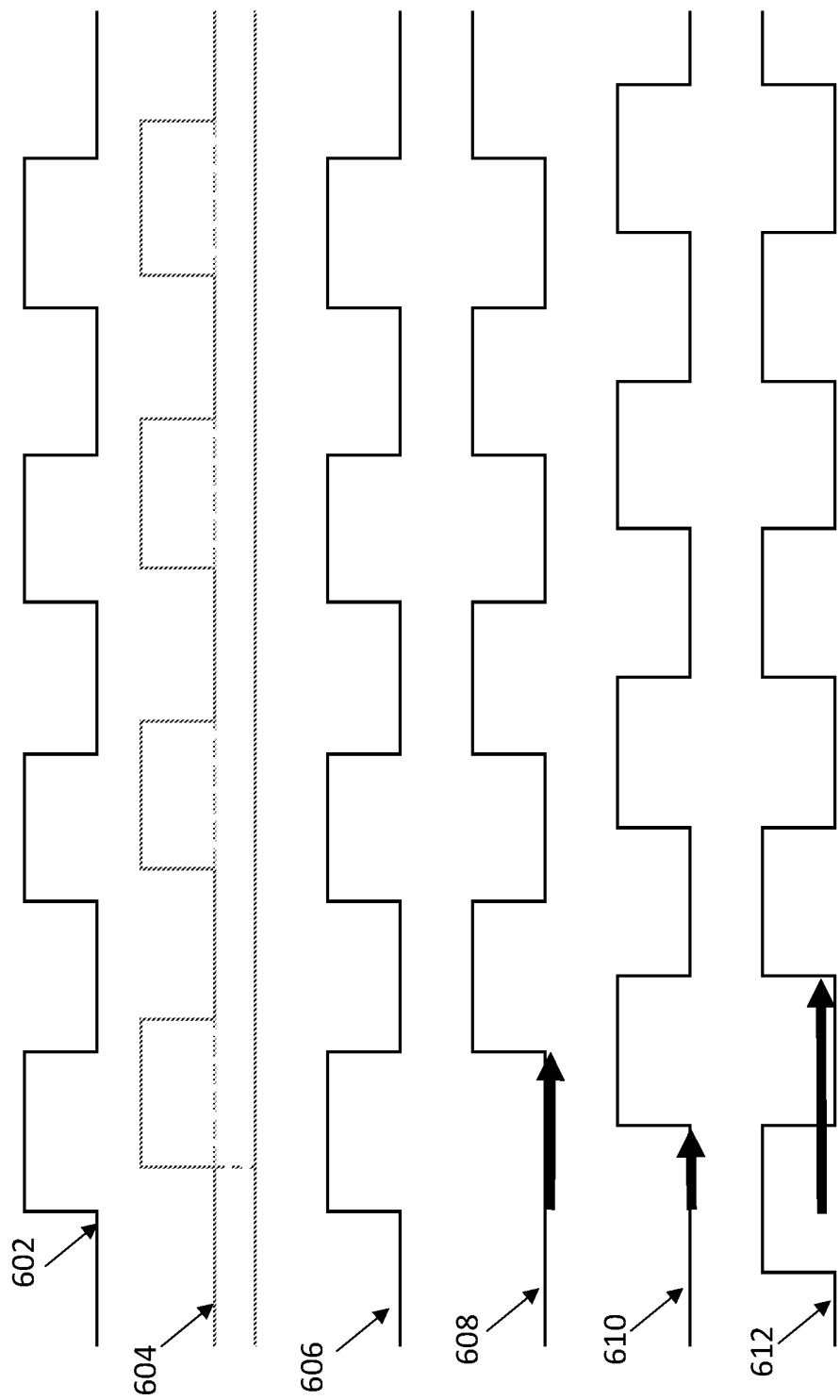
FIG. 6 shows a system with signals having a 50% duty cycle, according to some embodiments of the disclosure.

In some cases, the function $G_{P_M}$ may take in more than one number. For example, in some time-of-flight systems the signals sent to the light emitters and sensor have 50% duty cycle. FIG. 6 shows a system with signals having a 50% duty cycle, according to some embodiments of the disclosure. The light signal 602 of FIG. 6 is shown in the top graph. The first light pulse begins at time t=0 and ends at time $t=t_L$. The next light pulse begins at time $t=2t_L$. The second graph shows the light hitting the sensor 604, which includes reflected light and background light. The next four graphs show sensor signals stored in each of four units. The third graph shows the sensor signals 606 collected at unit 0. The fourth graph shows the sensor signals 608 collected at unit 1. The fifth graph shows the sensor signals 610 collected at unit 2. The sixth graph shows the sensor signals 612 collected at unit 3.

Figure 7:
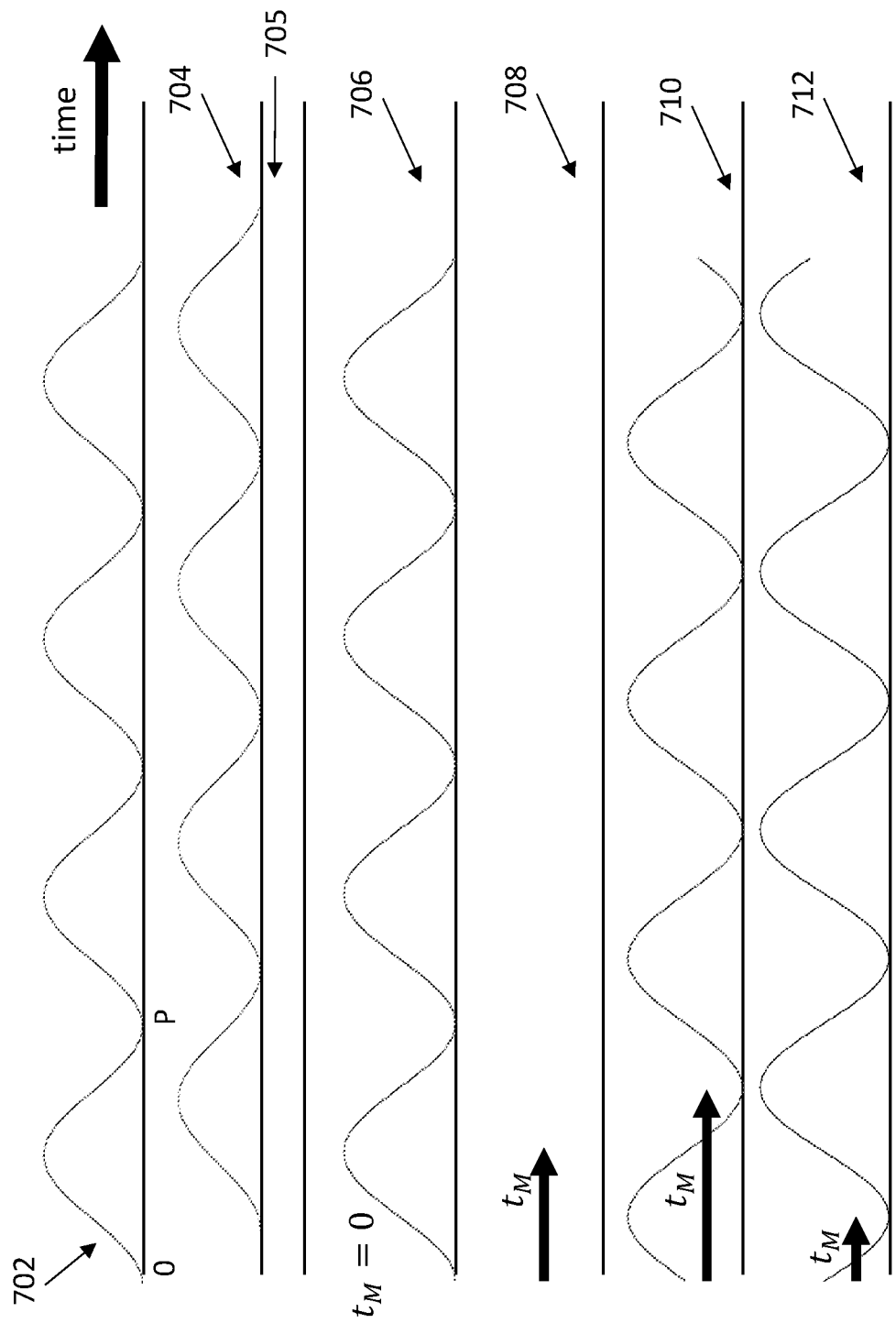
FIG. 7 shows a system with a sinusoidal light signal, according to some embodiments of the disclosure.

FIG. 7 shows a system with a sinusoidal light signal, according to some embodiments of the disclosure. FIG. 7 shows a light signal 702 in the top graph. The second graph shows the light hitting the sensor 704, which includes background light component 705. The next four graphs show sensor signals stored in each of four units. The third graph shows the sensor signals 706 collected at unit 0. The fourth graph shows the sensor signals 708 collected at unit 1. The fifth graph shows the sensor signals 710 collected at unit 2. The sixth graph shows the sensor signals 712 collected at unit 3.

If the signals are assumed in an idealization to be perfect sinusoids as in FIG. 7, then the light output power 702 as a function of time may be given by equation (4):

$$L(t) = l\left(-\cos\left(\frac{2\pi t}{P}\right) + 1\right) \quad (4)$$

where P is the period of all the signals, and l is a constant. In various examples, each storage unit has a phase φ associated with it, which is the phase delay between the light signal and the sensor signal. The sensor sensitivity over time is represented by the equation (5):

$$\lambda_\phi(t) = s \times \left(-\cos\left(\frac{2\pi t}{P} + \phi\right) + 1\right) \quad (5)$$

where s is a constant. The light returning to the sensor 704 is given by equation (6):

$$R(t) = A\left(-\cos\left(\frac{2\pi(t-t_R)}{P}\right)+1\right)+B \qquad (6)$$

where A is the amplitude of the return light, which depends on the reflectivity of the object in the scene, and B is the contribution from background light. A is proportional to the light source output power. The signal storage in each of the charge units is proportional to the integral over time of the sensor sensitivity multiplied by the light flux arriving at the sensor as represented in equation (7):

$$\xi_\phi = \int_0^P \lambda_\phi(t) R(t) dt = \frac{l\, s\, A\, P}{2}\cos\left(\phi + \frac{2\pi t_R}{P}\right) + s\, P\, (Al+B) \qquad (7)$$

In various implementations, the four measurements for the collected signals $S_i$ in each storage unit have different repetition numbers $N_i$. In one example, the measurements for the collected signals are defined as follows:

$$S_0 = N_0 \xi_0,\ S_1 = S_1 \xi_\pi,\ S_2 = N_2 \xi_{\frac{\pi}{2}},\ S_3 = N_3 \xi_{\frac{3\pi}{2}}.$$

Using these values, the idealized case of sinusoidal signals can be represented by equation (8):

$$\frac{\frac{N_0}{N_3} S_3 - \frac{N_0}{N_2} S_2}{S_0 - \frac{N_0}{N_1} S_1} = \tan\left(\frac{2\pi t_R}{P}\right) \qquad (8)$$

The ToF depth measurement can be obtained using equation (9):

$$D = \frac{c}{2}\frac{P}{2\pi}\arctan\left(\frac{\frac{N_0}{N_3} S_3 - \frac{N_0}{N_2} S_2}{S_0 - \frac{N_0}{N_1} S_1}\right) \qquad (9)$$

According to various examples, the scheme described above does not distinguish between distances D and $$D + \frac{cP}{2}.$$

Separate measurements can be used to determine the depth, for example the same measurement with a different P, such that the two measurements uniquely determine D. Alternatively, the measurements $S_i$ can be chosen to have different periods. In one example, for $S_0$ the light source and sensor are on for a single period P and then shut off for some time larger than P, and then once the light has travelled a distance $$\frac{cP}{2}$$

or larger, $S_0$ will no longer capture a signal. If a separate storage unit $S_4$ is used to measure solely background light, and the difference between the $S_0$ and $S_4$ measurements is small enough, then this proves that the distance to the object is more than $$\frac{cP}{2},$$

and ambiguity of the distance measurement can be avoided by only reporting distance measurements smaller than or equal to $$\frac{cP}{2}.$$

In various implementations, the light source and the sensor sensitivity are not truly sinusoidal. In some examples, when the lights source and the sensor sensitivity are not truly sinusoidal, a lookup table G(x) is learned and applied to $$\left(\frac{\frac{N_0}{N_3} S_3 - \frac{N_0}{N_2} S_2}{S_0 - \frac{N_0}{N_1} S_1}\right),$$

such that the distance D is represented by equation (10):

$$D = G\left(\frac{\frac{N_0}{N_3} S_3 - \frac{N_0}{N_2} S_2}{S_0 - \frac{N_0}{N_1} S_1}\right) \qquad (10)$$

When signals are perfectly sinusoidal, this equation can be rewritten as equation (11):

$$G(x) = \frac{c}{2}\frac{P}{2\pi}\arctan(x) \qquad (11)$$

In various implementations, there are many possible schemes involving measurements with more storage units $S_i$. In some examples, the schemes cancel out higher order harmonics in the final measurement, thus making the lookup table more linear. The schemes described above are generally of the form of equation (12):

$$D = G\left(\frac{\Sigma_i a_i S_i}{\Sigma_i b_i S_i}\right) \qquad (12)$$

for a set of parameters $a_i$ and $b_i$ and a lookup table G(x). The parameters are chosen to reduce the dependence on background light, and such that the quantity $$\frac{\Sigma_i a_i S_i}{\Sigma_i b_i S_i}$$

depends monotonically on depth. In some examples, the quantity $$\frac{\Sigma_i a_i S_i}{\Sigma_i b_i S_i}$$

does not depend monotonically on depth, and other quantities of the same form, $$\frac{\Sigma_i c_i S_i}{\Sigma_i d_i S_i}$$

for a set of parameters $c_i$ and $d_i$, are measured and computed as well, and a lookup table $$G\left(\frac{\Sigma_i a_i S_i}{\Sigma_i b_i S_i}, \frac{\Sigma_i c_i S_i}{\Sigma_i d_i S_i}\right)$$

is created. In some examples, creation of a look-up table is possible if the set of quantities uniquely determine the depth for the depth range in which the system is desired to be used. For example, for the scheme described above, with the dependence on P made explicit:

$$\xi_\phi(P) = \int_0^P \lambda_\phi(t) R(t) dt = \frac{l\,s\,A\,P}{2}\cos\left(\phi + \frac{2\pi t_R}{P}\right) + s\,P\,(Al+B) \quad (13)$$

$$S_0(P) = N_0 \xi_0(P),\; S_1(P) = N_1 \xi_\pi(P), \quad (14)$$
$$S_2(P) = N_2 \xi_{\frac{\pi}{2}}(P),\; S_3(P) = N_3 \xi_{\frac{3\pi}{2}}(P)$$

$$\frac{\frac{N_0}{N_3} S_3(P) - \frac{N_0}{N_2} S_2(P)}{S_0(P) - \frac{N_0}{N_1} S_1(P)} = \tan\left(\frac{2\pi t_R}{P}\right) \quad (15)$$

According to some examples, the above equations have the ambiguity that the distance D and $$D + \frac{cP}{2}$$

cannot be distinguished because $t_R$ is determined modulo the period P. In some implementations, another set of measurements at a different period P' are performed:

$$S_0(P') = N_0 \xi_0(P'),\; S_1(P') = N_1 \xi_\pi(P'), \quad (16)$$
$$S_2(P') = N_2 \xi_{\frac{\pi}{2}}(P'),\; S_3(P') = N_3 \xi_{\frac{3\pi}{2}}(P')$$

$$\frac{\frac{N_0}{N_3} S_3(P') - \frac{N_0}{N_2} S_2(P')}{S_0(P') - \frac{N_0}{N_1} S_1(P')} = \tan\left(\frac{2\pi t_R}{P'}\right) \quad (17)$$

Using the two estimates of $$\tan\left(\frac{2\pi t_R}{P}\right)$$

and $$\tan\left(\frac{2\pi t_R}{P'}\right)$$

in equations (15) and (17), the unambiguous range can be extended. For example, if $$\frac{P}{P'}$$

is an irrational number, then the unambiguous range is infinite. In particular, the first equation $$\tan\left(\frac{2\pi t_R}{P}\right)$$

cannot distinguish between $t_R$ and $t_R + n\,P$ for any integer n, and the second equation $$\tan\left(\frac{2\pi t_R}{P'}\right)$$

cannot distinguish between $t_R$ and $t_R + n\,P'$ for any integer n. For both equations to combined give the same ambiguity, both equations should be able to distinguish between one value $t_R$ and another value $t'_R$. In some examples, for the first equation to be ambiguous, $t'_R - t_R = n\,P$ for some integer n. In further examples, for the second equation to be ambiguous, $t'_R - t_R = n'\,P'$ for some integer n'. Therefore, $n\,P = n'\,P'$ which is not possible if $$\frac{P}{P'}$$

is irrational.

According to various implementations, the quantities have acceptably low dependence on background light. In all the schemes the number of repetitions $N_i$ for each storage unit $S_i$ can be different, for example if in the equation determining depth $S_i$ is replaced by $$\frac{N_0}{N_i} S_i.$$

Also, in some implementations, it is possible to forego using N storage units $S_i$ when the equation for depth depends on N measurements $S_i$. For example, some additions are done directly in hardware. If a quantity $\Sigma a_i S_i$ appears in a quantity and the $a_i$ are positive, then the measurement can be carried out by measuring $S_i$ and collecting it $a_i$ times, and storing the result in a single storage unit. If the $a_i$ are not integers, then $\Sigma a_i S_i$ can be multiplied by a number M such that $M a_i$ can be approximated to the nearest integer, and the desired result can be obtained by computing the following:

$$\frac{1}{M} \times$$

(repeat $S_i$ measurement $Ma_i$ times and collect in one storage unit)

If some $a_i$ are negative, then the measurement may also be possible in hardware by using differential measurements.

According to various implementations, the calibration of a system involves determining and storing the information used to turn the measured values at the storage units for each pixel into a depth estimate. For example, as described above, a lookup table G can be defined that takes in quantities of the form $$\frac{\Sigma_i a_i S_i}{\Sigma_i b_i S_i}$$

where $S_i$ are the storage unit values, and outputs a depth estimate. One example scheme for calibration is to place the depth imager in front of a rail that carries an object such as a flat plane, and moves the object to different distances from the imager. As the object moves to prescribed distances, the values $S_i$ at the storage units of pixels are stored, the quantities $$\frac{\Sigma_i a_i S_i}{\Sigma_i b_i S_i}$$

are calculated, and since the distance D between the object and imager is known, the associated distance D is stored. Thus, a lookup table, which is a table of correspondences between the quantities $$\frac{\Sigma_i a_i S_i}{\Sigma_i b_i S_i}$$

and the distances D, can be stored. When the imager is used, if a value for $$\frac{\Sigma_i a_i S_i}{\Sigma_i b_i S_i}$$

is obtained that is in between two values stored in the lookup table, interpolation can be used to give a depth estimate. For example, linear interpolation can be used between the values of D associated with the values of $$\frac{\Sigma_i a_i S_i}{\Sigma_i b_i S_i}$$

closest to the measured value to give a depth estimate. The number of steps taken during calibration depends on the desired accuracy. One can test different step sizes when moving the object on the rail and determine how much the accuracy changes. An accuracy cutoff can be set to determine how many elements to store in the lookup table. In one example, a single lookup table is stored for all pixels. In another example, the differences between the pixels are large and a different lookup table is stored for each pixel. Differences between pixels may be large due to manufacturing differences at the pixel level that lead to different depth estimates for pixels looking at objects at the same distance.

Such a calibration using a rail may be time consuming, as an object has to be physically moved (or alternatively, the imager is put on the rail and moved). Another approach to calibration is to simulate distance by introducing delays between the signals controlling the light sources and the signals controlling the sensor corresponding to each $S_i$. Each measurement $S_i$ can have a time delay $t_{M_i}$, which characterizes the time delay between the light source turning on and the sensor turning on. In some examples, a camera is placed in front of a target at a known distance $D_T$, and the set of measurements $S_i$ obtained with their respective time delays $t_{M_i}(D_T)$ is used to populate the lookup table for the distance $D_T$. If the target is moved to a different distance D, the return light to the sensor is delayed by a time $$\frac{2(D_T - D)}{c}.$$

In some examples, instead of moving the target, $$\frac{2(D_T - D)}{c}$$

is subtracted from the time delays $t_{M_i}(D_T)$. That is, if the delays $t_{M_i}$ are replaced by $$t'_{M_i}(D, D_T) = t_{M_i}(D_T) - \frac{2(D_T - D)}{c},$$

then the resulting measurements $S_i$ are equivalent to the measurements one would get for some target at a distance D from the camera. For example, for the measurement in FIG. 3, there is a time delay $t_M$ between turning on the light source and turning on the sensor. Increasing the time delay $t_M$ simulates the presence of an object closer to the camera. The measurement for the collected signals is represented by equation (18):

$$M_{P_M}(t_R, a, b) = \sum_{i=0}^{N-1} \int (a\,f_{P_L}(t - t_R) + b)\, g_{P_S}(t - t_M)dt \qquad (18)$$

The equation can be rewritten as $\Sigma_{i=0}^{N-1} \int (af_{P_L}(t)+b)\, g_{P_S}(t'+t_R-t_M)dt'$, and therefore the measurement of the collected signals depends on $t_R$ and $t_M$ only through the quantity $t_R-t_M$. Thus, increasing $t_M$ is equivalent to decreasing $t_R$. For a real target, the amount of return light may decrease quadratically with distance. However, when replacing $$t_{M_i}(D_T) \text{ by } t'_{M_i}(D, D_T) = t_{M_i}(D_T) - \frac{2(D_T - D)}{c},$$

the reflectivity of an equivalent target at distance D does not decay quadratically with target distance D. Thus, signal strength is not decreased with distance. Furthermore, since the depth does not depend on the reflectivity of the target due to the ratio in depth calculations, once $$\frac{2(D_T - D)}{c}$$

is subtracted from the $t_{M_i}(D_T)$ measurements, the corresponding $S_i$ are measured and the quantities $$\frac{\Sigma_i a_i S_i}{\Sigma_i b_i S_i}$$

for the lookup table are calculated, the values of the lookup table for distance D can be populated. Thus, in various examples, by sweeping over the different values of D, a part (or all) of the lookup table is updated without moving the target or the sensor.

In traditional calibration techniques, the lookup table $G_{P_M}$ depends on the parameters $P_M$ that the measurements $$M_{P_M, t_{M_0}}, M_{P_M, t_{M_1}}, M_{P_M, t_{M_2}}$$

depend on. Therefore, to obtain accurate depth estimates, the parameters that affect $G_{P_M}$ are measured, and the changes of $G_{P_M}$ as a function of $P_M$ can be characterized and used to keep the lookup table accurate over time. When there are many parameters that significantly affect the lookup table, the amount of memory and computation to keep the lookup table accurate is large. Also, calibration takes a long time, which can be a problem especially for large volume applications. Finally, a system that is calibrating interferes with other nearby systems, thus possibly making it difficult to calibrate many systems at once in the same area. If a system is put in a chamber that can change its temperature to study the temperature dependence of the lookup table, then it would be desirable to put many systems at once in such a chamber and be able to calibrate them simultaneously. Also, the lookup table may depend on parameters that are hard to measure, such as the temperature of different parts of the imager where no temperature sensor is present. Furthermore, the parts of the imager may age over time, such that the correct lookup tables would change over time. Therefore, systems and methods are provided to update the calibration table on-the-fly, while the system is deployed. Conventional techniques do not allow for accurate on-the-fly calibration because conventional techniques require having an object at a known distance from the sensor.

On-the-Fly Calibration

Various systems and methods are described herein for on-the-fly calibration. According to various implementations, the systems and methods described herein use measurements of the placement of the imaging sensor and light source with respect to each other. In particular, depending on the placement of the imaging sensor and light source with respect to each other, the amount of signal received by a pixel as a function of distance to a given object take the form shown in the graph 800 of FIG. 8A. As the distance D to the object decreases, as shown on the x-axis, the amount of signal increases quadratically with inverse distance, as shown on the y-axis. The signal can become so large that some pixels become saturated. However, as the distance decreases further the signal level decreases again. For example, in the extreme case of putting the obstruction right up against the light emitter 802 thus completely blocking it, there is no signal. As the obstruction is backed away from D=0, the signal level increases as light rays begin to leave the light emitters, bounce off the obstruction and enter the lens. The light emitters emit light over a solid angle which can be tunable, for example by placing a diffuser and/or aperture in front of the light emitters.

Figure 8B:
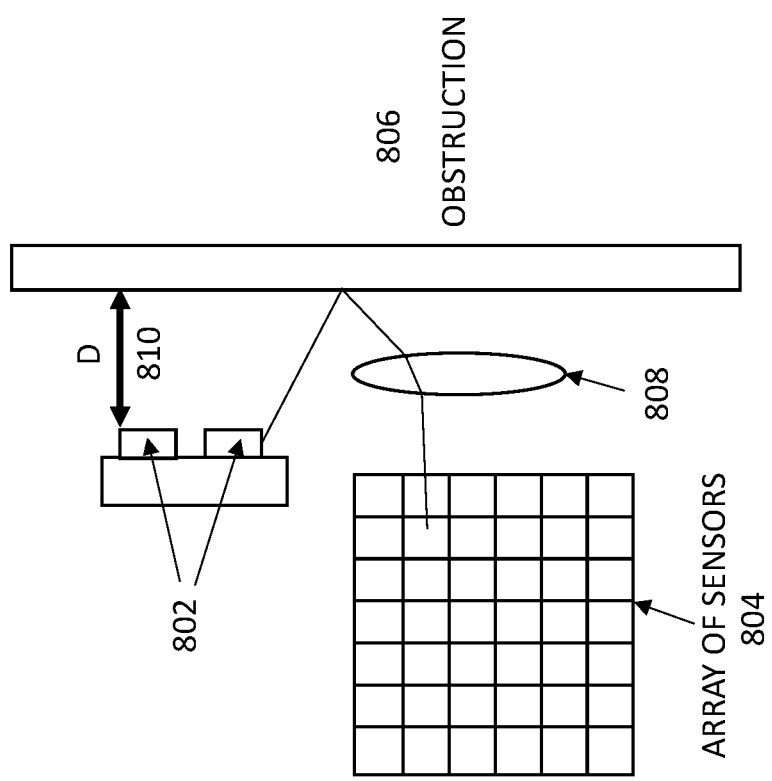

FIG. 8B shows an imaging system including light emitters 802, an obstruction 806, a lens 808, and an array of sensors 804, according to various embodiments. FIG. 8B shows the distance D 810 between the light emitters 802 and the obstruction 806. As represented in the graph 800 of FIG. 8A, when the distance D 810 between the light emitters and the obstruction is zero (when the obstruction 806 is adjacent to the light emitters 802), no light is emitted. As the obstruction 806 is moved away from the light emitters 802, the distance D 810 increases, and light emitted from the light emitters 802 is reflected off the obstruction 806, entering the lens 808 and the array of sensors 804.

Figure 9:
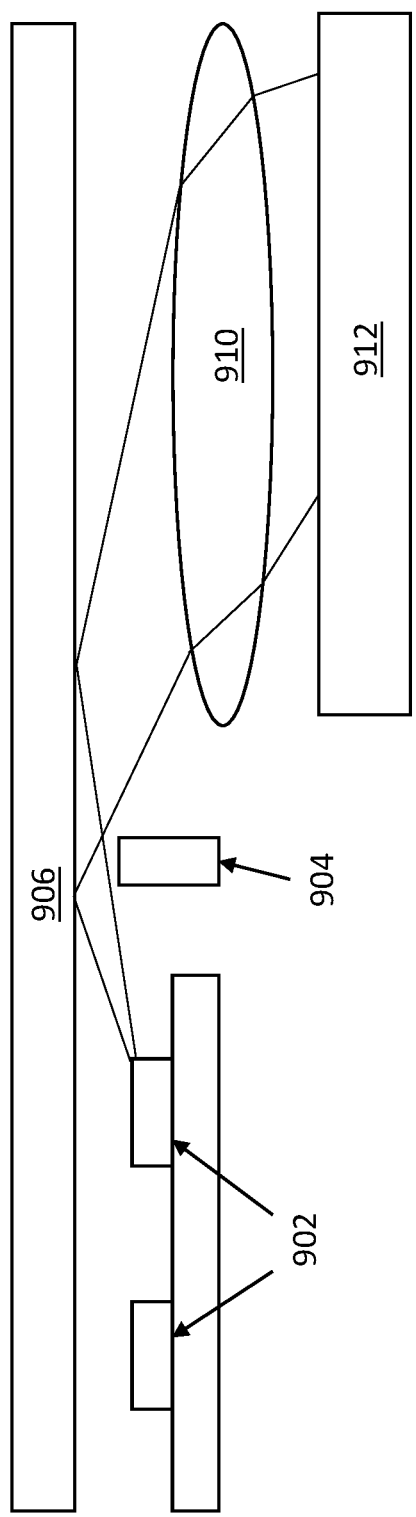
FIG. 9 shows an imaging system, according to some embodiments of the disclosure.

As shown in FIG. 9, one or more light blocks 904 can be placed in the imaging system. In one example, a light block 904 is placed next to the light emitters 902. The light block 904 prevents potential light transmission directly from the light emitters 902 to the sensor array 912, Thus, light from the light emitters 902 first hits the obstruction 906 and is reflected off the obstruction 906 to the lens 910 and sensor array 912. In another example, a light block 904 is placed next to the lens 910 and imaging array 912.

According to various features, adding a light block 904 impacts the signal strength curve 800 shown in FIG. 8A. The signal strength depends on the pixels in the imager array 912. For example, pixels closer to the light emitters 902 receive more light, because pixels close to the light emitters 902 receive light through the lens 910 from a part of the obstruction 906 that is close to the light emitters 902. The closer a part of the obstruction 906 is to the light emitters 902, the more light that part of the obstruction receives relative to parts of the obstruction 906 further from the light emitters 902.

In various implementations, the obstruction 906 is shaded. In some examples, the obstruction 906 is partially shaded, making some areas of the obstruction 906 brighter and others darker. A shaded obstruction 906 also leads to different pixels receiving different signal strengths. In various implementation, some pixels of the sensor 912 saturate and other pixels of the sensor 912 to not receive enough signal. Thus, an obstruction 906 may be shaded to increase variation in signal strength received at the sensor array 912. According to some examples, when pixels of the imaging array 912 receive different signal strengths, the pixels that receive enough signal strength but do not saturate are selected for use in calibration.

According to various implementations, the distance between the light emitters 902 and the obstruction 906 that leads to an acceptable signal level at one or more pixels of the sensor array 912 is quite small. In some examples, the distance between the light emitters 902 and the obstruction 906 is about 5 millimeters (mm), about 4 mm, about 3 mm, about 2 mm, about 1 mm, or less than about 1 mm. In other examples, the distance between the light emitters 902 and the obstruction 906 is more than about 5 mm. There are several advantages to having a small distance between the light emitters 902 and the obstruction 906. For example, if the obstruction 906 fully blocks the light emitters and the sensor array 912, then the system will not be impacted by neighboring systems emitting light. Therefore, multiple systems can be placed in close proximity to each other and calibrated independently. For example, multiple systems can be placed simultaneously in a temperature chamber to perform temperature dependent calibration. In various examples, about 100 systems can be placed simultaneously in a temperature chamber to perform temperature dependent calibration, more than 100 systems can be placed simultaneously in a temperature chamber to perform temperature dependent calibration, about 500 systems can be placed simultaneously in a temperature chamber to perform temperature dependent calibration, more than 500 systems can be placed simultaneously in a temperature chamber to perform temperature dependent calibration, about 1000 systems can be placed simultaneously in a temperature chamber to perform temperature dependent calibration, or more than 1000 systems can be placed simultaneously in a temperature chamber to perform temperature dependent calibration.

According to various implementations, by enabling calibration with placement of the obstruction 906 at a short distance allows for the design of a small system with built-in calibration capability. In some examples, systems and methods are presented for a system a mobile obstruction 906. An example of such an obstruction is a shutter.

Figure 10B:
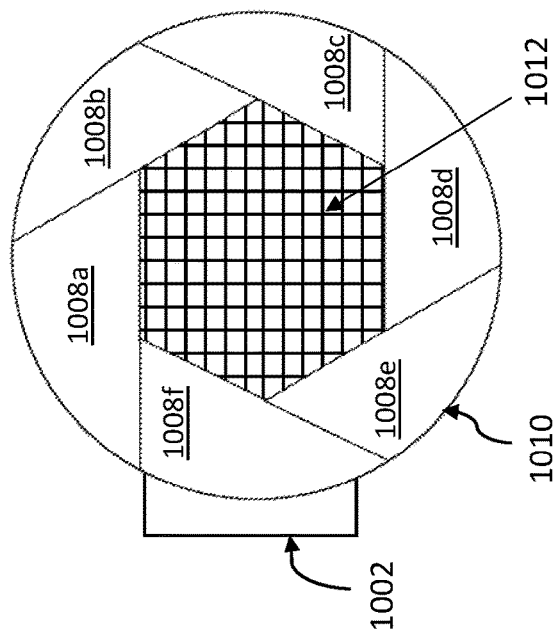
Figure 10A:
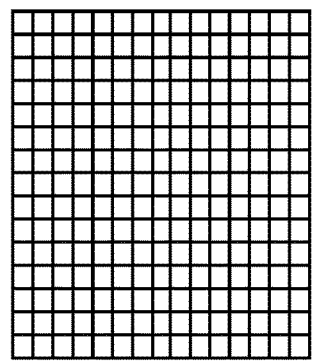
Figure 10C:
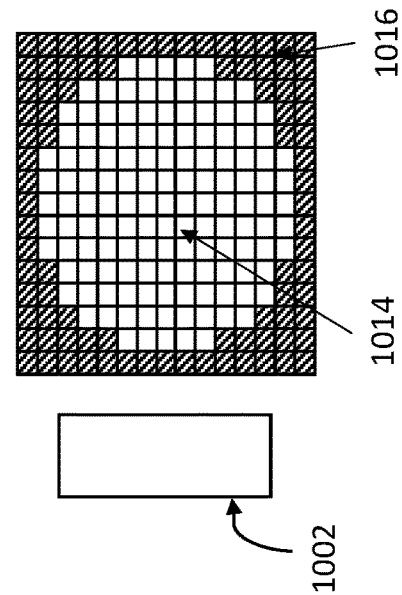

FIGS. 10A-10E show an imaging system 1000 having a shutter, according to some embodiments of the disclosure. The imaging system 1000 includes a light emitter 1002, a sensor array 1004, and a shutter 1010. FIG. 10A shows the light emitter 1002 adjacent to a sensor array 1004. FIG. 10B shows the light emitter 1002, the sensor array 1004, and a shutter 1010. The shutter 1010 includes six shutter elements 1008a-1008f, and, in FIG. 10B, the shutter 1010 is partially open and partially blocking the sensor array 1004. The partially open shutter 1010 includes an aperture 1012 defined by an opening in the middle of the six shutter elements 1008a-1008f. FIG. 10C shows the sensor array 1004 behind the shutter. Behind the shutter 1010, some pixels 1014 are positioned behind the aperture 1012 of the shutter 1010 and are thus potentially exposed to emitted reflected light from the light emitters 1002. Other pixels 1016 (shaded) of the sensor array 1004 are positioned behind the shutter elements 1008a-1008f and are blocked from receiving emitted reflected light from the light emitters 1002.

According to various examples, as shown in FIG. 10B, the shutter 1010 includes six shutter elements 1008a-1008e, and the shutter elements 1008a-1008e can be moved to change the size of the aperture 1012. When the shutter is open as in FIG. 10B, one or more of the pixels of the sensor array 1004 are unobstructed, and they can be used to determine the ToF depth measurement.

FIG. 10D shows the shutter 1010 with the shutter elements 1008a-1008f fully closed. When the shutter elements 1008a-1008f are fully closed, the pixels of the sensor array 1004 are obstructed. FIG. 10E shows the sensor array 1004 with the pixels obstructed by the shutter 1010. When the shutter elements 1008a-1008f are fully closed, the shutter 1010 acts as an obstruction similar to the obstruction 906 of FIG. 9. Thus, when the shutter elements 1008a-1008f are closed, the pixels of the sensor array 1004 receive light from the light emitters 1002 and can be used to perform calibration measurements. In one example, a stored lookup table can be updated for the current parameters of the system such as temperature. In some examples, a few measurements can be made to determine that the stored lookup tables are accurate and further recalibration is no longer necessary.

In some implementations, instead of moving an obstruction in front of the imaging system, the imaging system can be moved behind an obstruction. FIGS. 11A-11B show a pop-up system 1004 for an imaging system, according to some embodiments of the disclosure. The pop-up system 1104 in FIGS. 11A-11B is attached to a cell phone, but, in various examples, the system 1104 can be attached to any selected device. When the imager 1104 is popped up, as shown in FIG. 11A, it can be used to acquire ToF depth information from a scene. When the imager 1104 is popped down, as shown in FIG. 11B, the imager 1104 has an obstruction in front of it. As described above with reference to FIGS. 8A, 8B and FIG. 9, the imager 1104 can be calibrated while popped down with an obstruction in front of it, as shown in FIG. 11B. According to other examples, there are other designs in which the imager 1104 can be moved such that there is an obstruction in front of the imager 1103 and recalibration can be done.

In some examples, the recalibration is quick. For instance, if only an offset is measured, recalibration is fast. In one example, the obstruction is known to be at 1.5 millimeters, and when the system is obstructed a distance of 2.3 millimeters is measured. Then the offset of the camera is 0.8 millimeters. Such an offset can be obtained using a single quick measurement. In other implementations, more information may be desired, such as multiple measurement points of the lookup table. In some examples, the system includes a heating element that can be used to obtain a temperature dependence. In some implementations, the camera heats up when operated at high frame rate or at a large pulse count. Thus, some temperature dependence can be obtained by, for example, first running the system at higher frame rate to heat it up. In another examples, some temperature dependence can be obtained by, for example, running a laser for a while without collecting signal to heat the laser up. In some examples, the temperature can be reduced somewhat from the current operating temperature by running the system at a lower frame rate than usual. Thus, the calibration can be done for the current temperature of the system, temperatures slightly below the current temperature, and temperatures slightly above the current temperature, by running the system in a different mode. For example, the mode can be changed by changing the frame rate can be changed to change the temperature of the system.

In some implementations, the shutter 1010 is only opens partially, such as in FIG. 10B. When the shutter 1010 is partially open as in 1008, some pixels 1012 are unobstructed, while some pixels 1016 are obstructed. In such a case, the obstructed pixels 1016 can be used to for calibration while the unobstructed pixels can be used for depth measurements.

According to some implementations, the calibration system includes an obstruction that is immobile. In some examples, in a system with an immobile obstruction, some pixels are reserved for calibration, while the rest of the pixels are used to determine depth.

Figure 12:
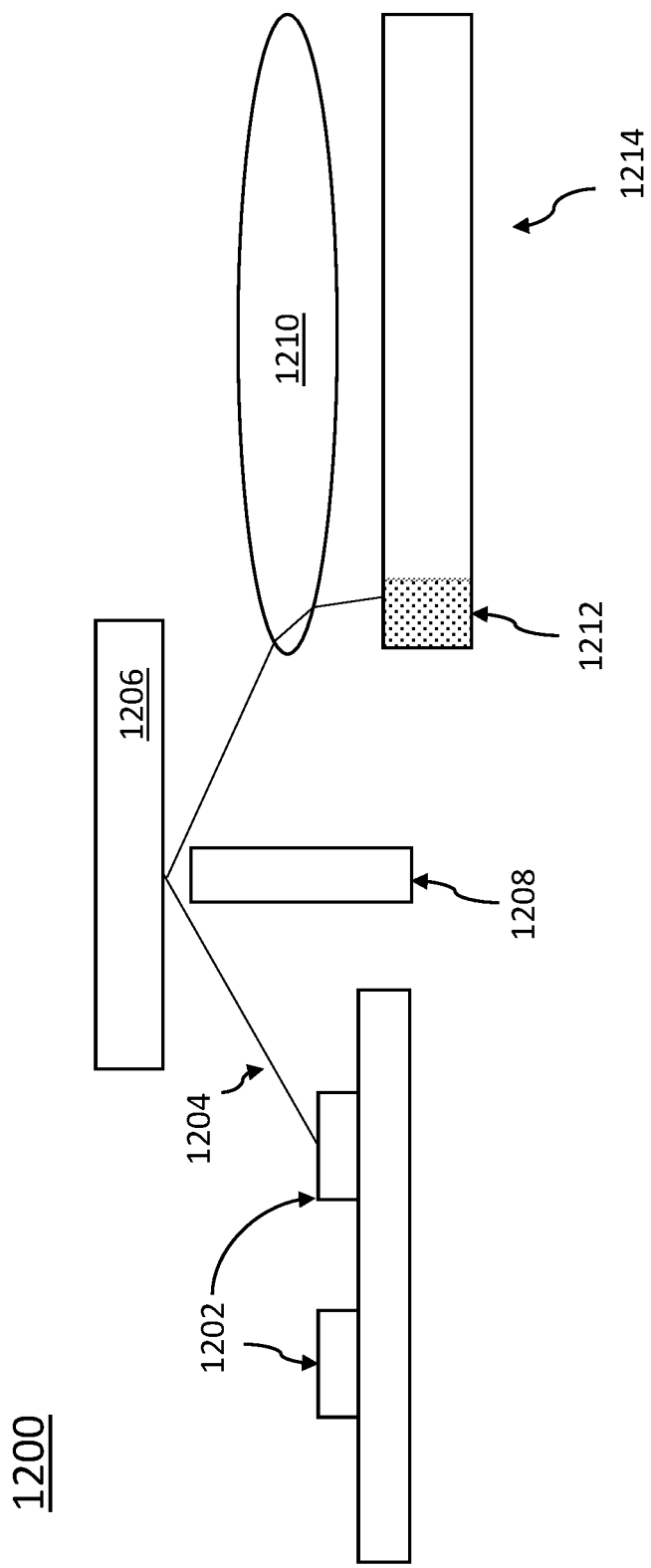
FIG. 12 shows another example of an imaging system, according to some embodiments of the disclosure.

FIG. 12 shows an example of an imaging system 1200 having a stationary obstruction 1206 and one or more dedicated pixels 1212 in the sensor array 1214, according to some embodiments of the disclosure. In particular, the obstruction 1206 is positioned to obstruct a some of the light emitted from the light emitters 1202. Light rays 1204 that hit the obstruction 1206 and are received at the pixels 1212 in the sensor array 1214 are used for calibration.

Figure 13:
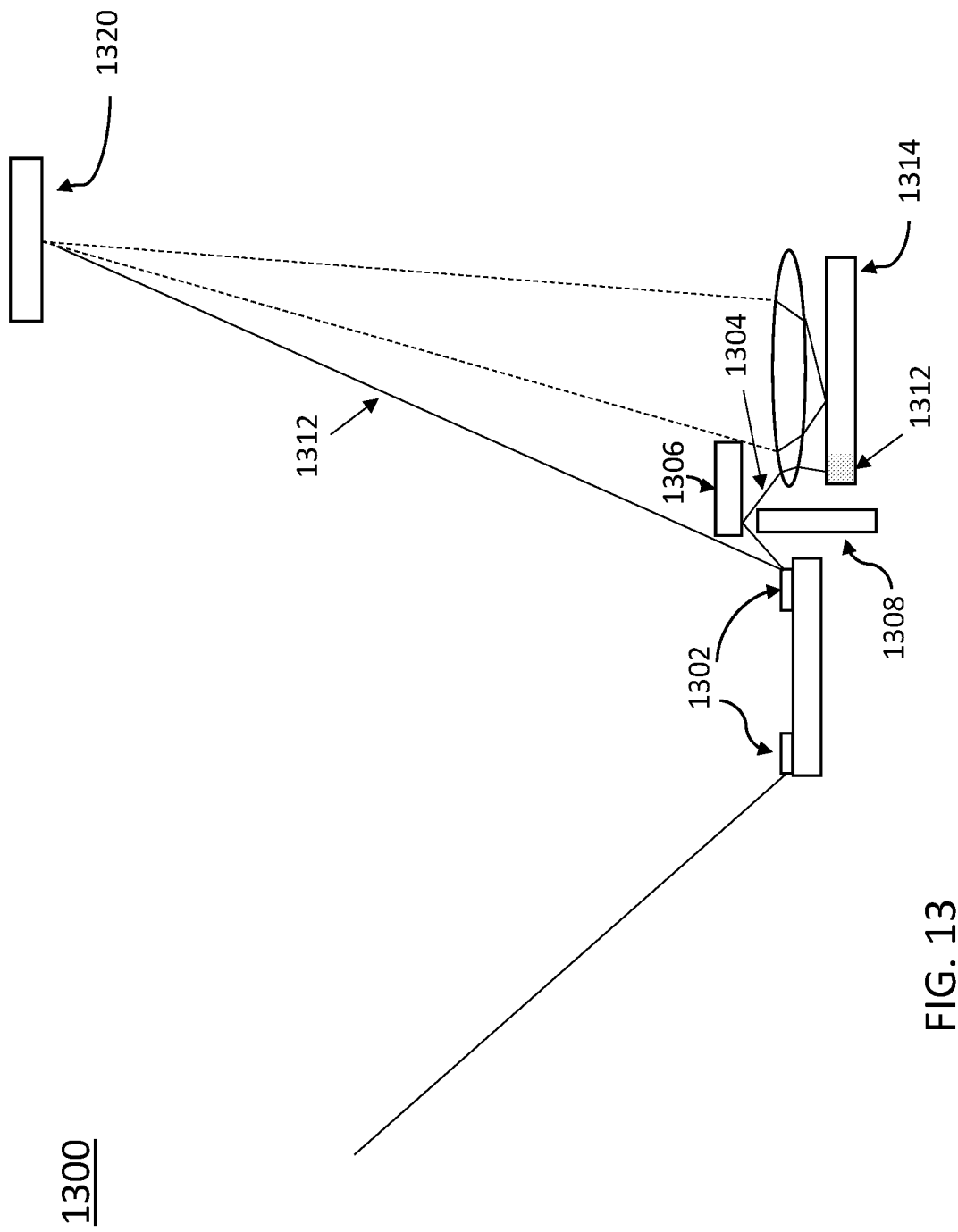
FIG. 13 shows another example of an imaging system, according to some embodiments of the disclosure.

FIG. 13 shows another example of an imaging system 1300 having a stationary obstruction 1306, according to some embodiments of the disclosure. The imaging system 1300 shows light rays emitted from the light emitters 1302. A first light ray 1312 leaves the imaging system 1300 and hits an object 1320 in a scene, and is reflected back to the lens and the sensor array 1314, where the distance to the object 1320 can be measured based on the reflected light rays. A second light ray 1304 from the light emitters 1302 reflects off the stationary obstruction 1306 and is received at the dedicated calibration pixels 1312 of the sensor array 1314. According to one feature, the obstruction 1306 blocks the dedicated calibration pixels 1312 from receiving light reflected from the scene, such that the dedicated calibration pixels 1312 only receive the light reflected off the obstruction 1306. The light collected at the calibration pixels 1312 can be used for calibration of the imaging system 1300.

Figure 14B:
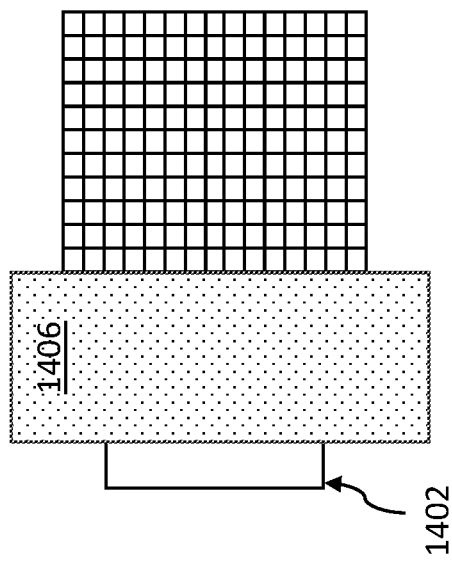
FIG. 14A-14C show an example of an obstructions and placement of light emitters, according to some embodiments of the disclosure.
Figure 14C:
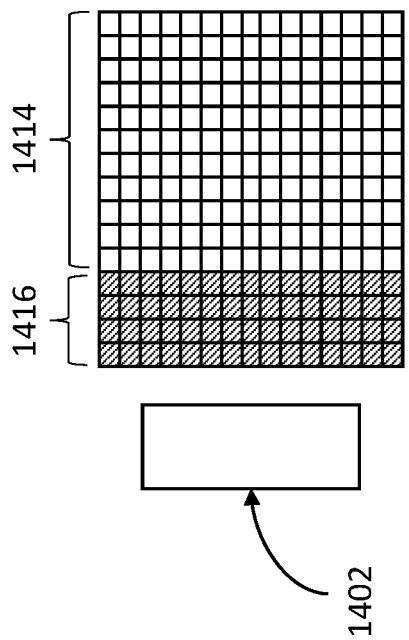
Figure 14A:
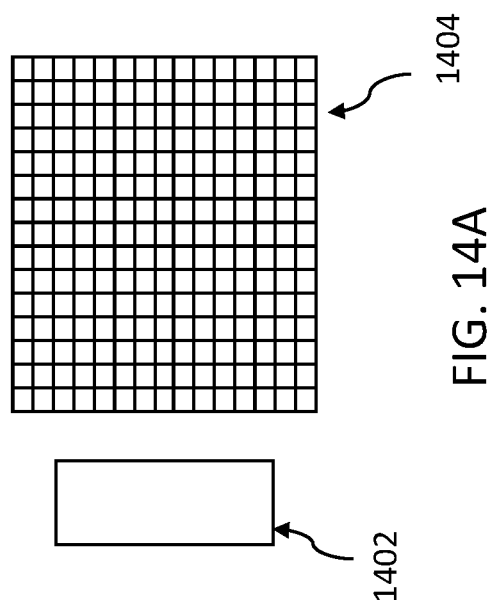

FIGS. 14A-14C show an example obstruction 1406 and placement of light emitters 1402, such that a subset 1416 of the columns of pixels of the image sensor 1404 are used for calibration. FIG. 14A shows a light emitter 1402 and a sensor array 1404. FIG. 14B shows the obstruction 1406 positioned over a portion of the sensor array 1404 and the light emitters 1402. FIG. 14C shows the subset 1416 of the sensor array 1404 that is used for calibration. As discussed above, the 1406 obstruction may be shaded. In some examples, the light emission pattern from the light emitters 1402 is designed such that the set 1416 of pixels reserved for calibration receive different a signal strength, thus allowing for calibration at different strengths of the emitters 1402.

In one example, a light emitter is brightest at the center and has an intensity that decays as moving away from the center. In some examples, a diffuser is placed in front of the light emitters 1402 and is shaded in a such a way as to change the light emission pattern.

In various implementations, the calibration depends on the number of repetitions of the measurements. Thus, running the system at higher number of repetitions increases the temperature as, for example, the light emitters are toggled on and off more frequently. Therefore, in some examples, if temperature impacts the lookup table, the number of repetitions of the measurements also impacts the lookup table. In some implementations, the imaging system is run at different numbers of repetitions, for example at high number to get enough signal for long distances, and low number to avoid saturation at short distances. When the system is run at varying numbers of repetitions, the calibration accounts for varying signal strengths. In some examples, including various pixels with different signal strengths is beneficial in systems with varying numbers of repetitions, because the system can include pixels that do not saturate and pixels that have adequate signal strength.

Figure 15B:
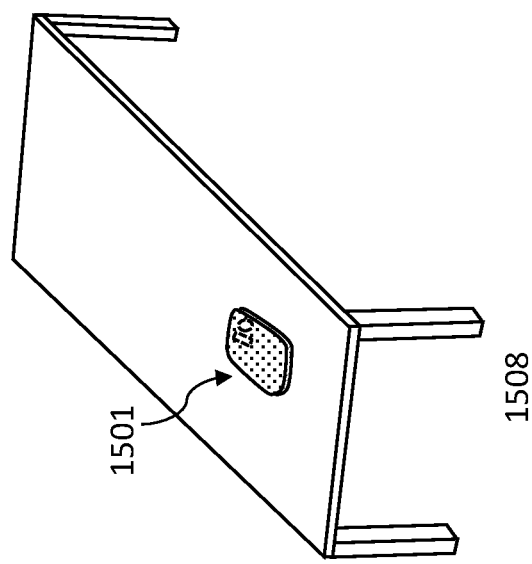
FIGS. 15A-15C show examples of imaging device obstructions, according to some embodiments of the disclosure.
Figure 15A:
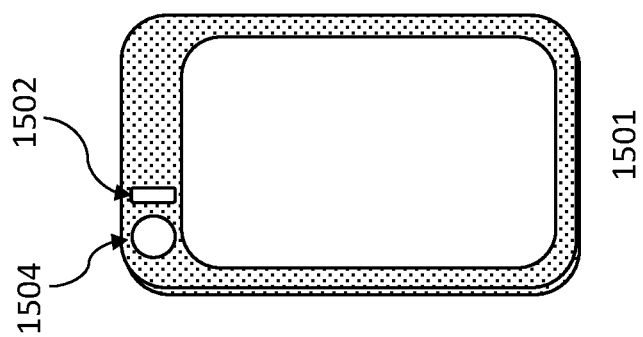
Figure 15C:
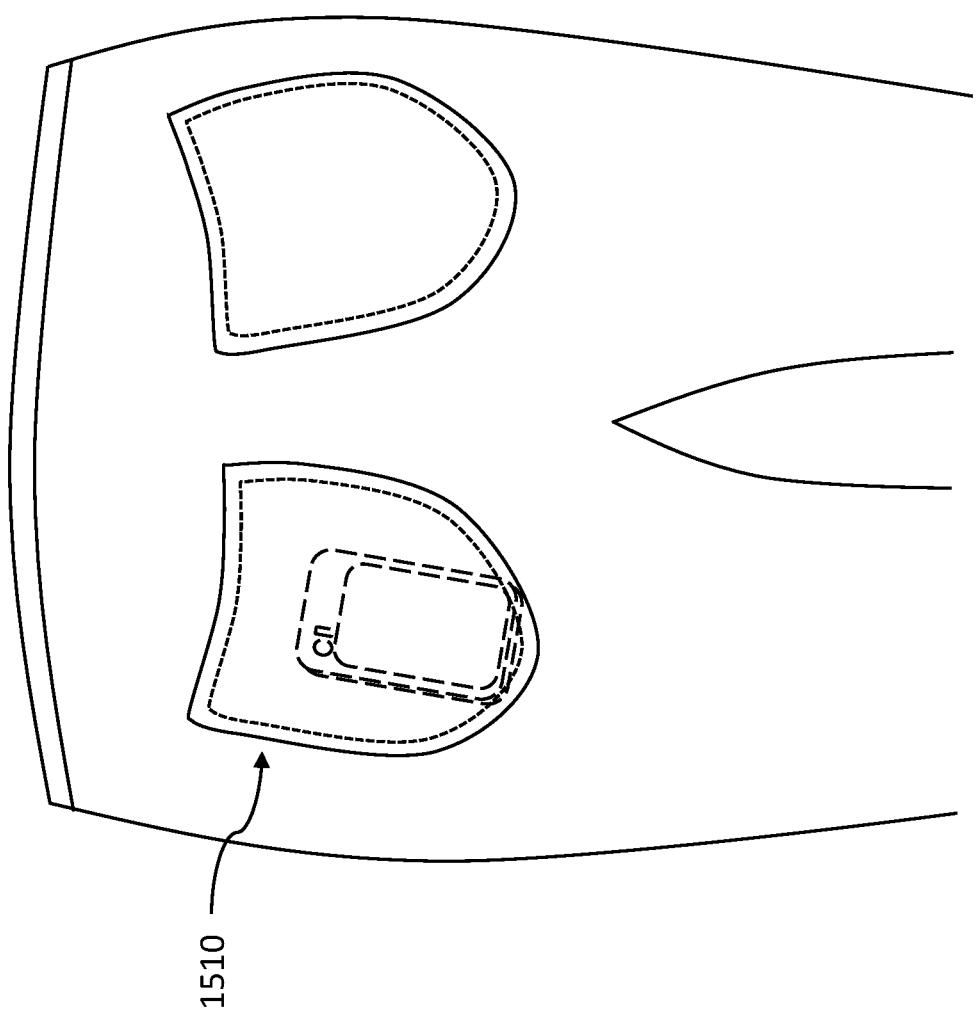

In some implementations, no obstruction (mobile or immobile) is built into the system, but the system is still designed to be able to perform on-the-fly calibration. FIGS. 15A-15C show examples of an imaging device 1501 and various obstructions, according to some embodiments of the disclosure. In FIGS. 15A-15C, the imager is part of a portable device 1501, such as a cell phone, or a handheld device used in an industrial application. The imager includes a light emitter 1502 and a sensor array 1504. According to various examples, when the device 1501 is placed face down, the surface it is placed against acts as an obstruction and can be used for calibration.

As shown in FIG. 15B, the device 1501 is placed on a table 1508, with the light emitter 1502 and the sensor array 1504 directed down toward the table 1508. The surface of the table 1508 acts as an obstruction and can be used for calibration. According to various examples, the distance between the light emitter 1502 and the obstruction is based on the device 1501 design.

In another example, shown in FIG. 15C, the device 1501 is placed in a pocket 1510, and the pocket 1510 acts as the obstruction. In various examples, when the imaging system detects that there is a nearby immobile surface, it calibrates itself. In one example, the system receives input from an accelerometer, and when the system is immobile and there is a nearby surface, the system may ascertain that it is lying flat against a surface. In other examples, even when the system is moving, it can calibrate itself with a nearby surface.

Figure 16:
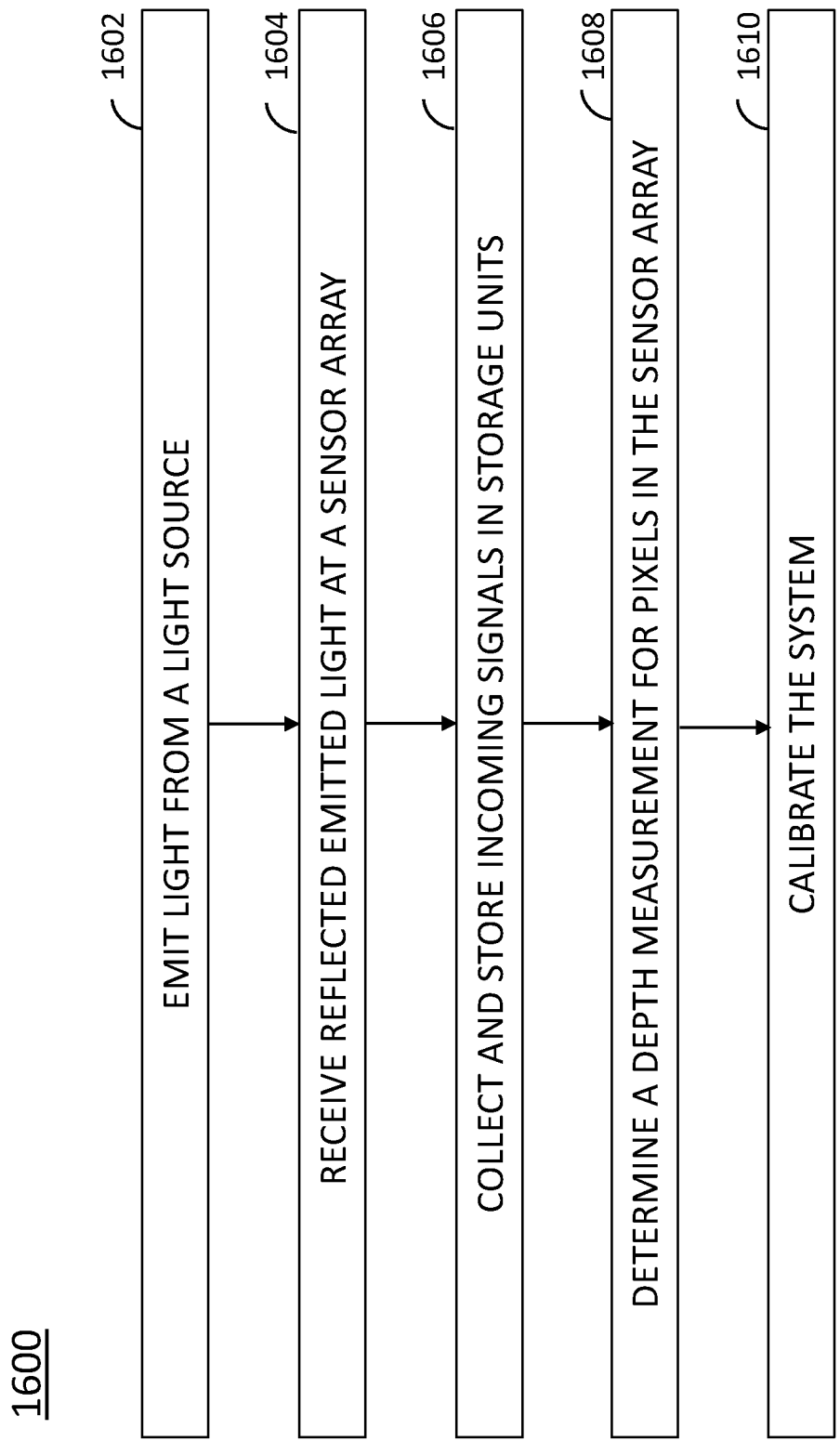
FIG. 16 shows a method of calibrating an imaging system, according to some embodiments of the disclosure.

FIG. 16 shows a method 1600 for calibrating an image processing system, according to various embodiments of the disclosure. The method includes, at step 1602, emitting light from a light source. At step 1604, reflected emitted light is received at a sensor array. The sensor array includes multiple pixels. Receiving the reflected emitted light includes receiving emitted light reflected off an integrated obstruction positioned at a predetermined distance from the light source. At step 1606, incoming signals at the pixels of the sensor array are collected and stored in a set of storage units. The set storage units correspond to the pixels of the sensor array, such that there is one storage unit for each pixel. At step 1608, a depth measurement for a plurality of pixels is determined. According to one feature, the depth estimate is determined based on unfiltered collected incoming signals. At step 1610, the image processing system is calibrated using the depth measurement.

In implementations in which illumination light is not emitted by the device, image analysis techniques may be used to estimate distances by comparing 2D images captured by the imaging device and detecting how an object or objects in those images change over time.

According to some embodiments, distances previously determined when illumination light was produced and captured may be used as a reference to aid in estimation of distance using 2D image analysis techniques. For example, illumination light may be emitted periodically to periodically determine distances, and in between those emissions image analysis may be performed to determine distances (e.g., using the previously-determined distances obtained using illumination light as a reference point).

According to some embodiments, a decision of whether to emit illumination light (to determine distances by collecting the reflected illumination light) may be based on an analysis of 2D images. The analysis may determine how accurate an estimation of distance will be based on one or more 2D images, so that when the accuracy falls below an acceptable threshold, a decision may be made to obtain a more accurate determination of distance using illumination light. In this manner, illumination light may be emitted only when a 2D image analysis does not produce acceptably accurate distance measurements, which may reduce the frequency with which the illumination light is emitted, thereby reducing power usage.

While aspects of the present disclosure may be used in any suitable imaging device, there may be particular advantages to applying such aspects within imaging devices that capture light during a plurality of frames, such as in video capture. Some imaging devices may be configured to ultimately preserve a single image yet may capture images a number of times prior to and/or after the image device has been activated to preserve the single image (e.g., devices configured to display a scene prior to capture of a single image for purposes of previewing the still image, and/or devices configured to capture a plurality of images when activated to capture a single image so that a single image can be selected and/or synthesized from the plurality of images). For the purposes of the discussion herein, a "frame" is considered to be applicable to both image capture during: (i) video capture; and (ii) still image capture where multiple images are registered in a device during the still image capture process (including, but not limited to, those examples above).

According to some embodiments, determining whether to emit illumination light based on an analysis of a 2D image may be performed in the same frame during which the 2D image was captured. Making the determination within the same frame may ensure that, in the case it is determined that illumination light is not to be emitted, a 2D image may be captured during the subsequent frame without there being an interim frame in which the determination is be made. Accordingly, the imaging device may operate efficiently by capturing an image during each frame. According to some embodiments, once it is determined that illumination light is to be emitted, the illumination light is emitted during the same frame during which the determination was made. Alternatively, if there is insufficient time during a frame to capture a 2D image, determine whether to emit illumination light and also emit the illumination light (e.g., because the imaging device does not have the processing capacity to perform all these steps within the frame because the frame time is very short and/or due to processing limitations of the device), the emission of illumination light may occur in a subsequent frame.

According to some embodiments, determination of a distance using illumination light, such as laser light from a laser diode, may use a pulse modulation technique. In pulse modulation, illumination light is emitted as a pulse of known duration so that the reflected light pulse can be identified and its time of flight measured (and therefore the distance to an object determined). In some implementations, a pulse modulation technique may operate an image sensor with a plurality of shutters that each capture a segment of the reflected illumination light pulse. The fraction of reflected illumination light that is measured during each shutter may imply the time of flight of the light pulse.

According to some embodiments, determination of a distance using illumination light may use a continuous wave technique. In such a technique, a distance to an object is determined by measuring a phase shift of light reflected from an object. The phase shift is indicative of a distance to the object when a wavelength of the illumination light is known.

Following below are more detailed descriptions of various concepts related to, and embodiments of, techniques of distance sensing. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 17:
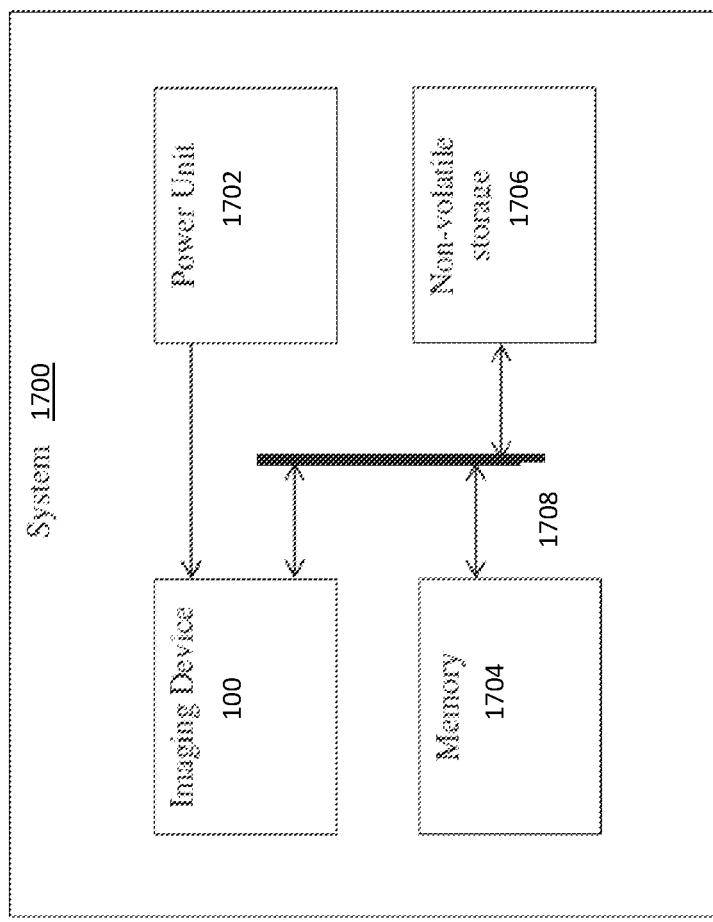
FIG. 17 illustrates an example of system incorporating an imaging device of the type described herein.

FIG. 17 illustrates an example of system incorporating an imaging device of the type described herein. An illustrative implementation of a system 1700 which may incorporate an imaging device of the types described herein and shown in FIG. 1. The system 1700 includes the imaging device 100 of FIG. 1, although imaging devices according to alternative embodiments described herein may alternatively be included. A power unit 1702 may be provided to power the imaging device 100, along with potentially power other components of the system. The power unit 1702 may be a battery in some embodiments, such as a battery typically used in mobile phones, tablets, and other consumer electronics products. As has been described, in some embodiments the imaging device 100 may provide low power operation, and thus may facilitate the use of a low power battery as the power unit 1702. However, the power unit 1702 is not limited to being a battery, nor is it limited to a particular type of battery in all embodiments.

The system 1700 further comprises a memory 1704 and a non-volatile storage 1706. Those components may be communicatively coupled to the imaging device 100 in any suitable manner, such as via a shared communication link 1708. The shared communication link 1708 may be a bus or other suitable connection. The memory 1704 and/or non-volatile storage 1706 may store processor-executable instructions for controlling operation of the imaging device 100, and/or data captured by the imaging device 100. In connection with techniques for distance sensing as described herein, code used to, for example, signal an illumination light source to produce one or more light pulses, to open and/or close a shutter of an image sensor, read out pixels of an image sensor, perform distance calculations based on collected illumination light, etc. may be stored on one or more of memory 1704 or non-volatile storage 1706. Processor 107 may execute any such code to provide any techniques for distance sensing as described herein. Memory 1704 may store data representative of 2D and/or 3D images captured by imaging device 100. The memory 1704 and/or non-volatile storage 1706 may be non-transitory memory in at least some embodiments.

Figure 18:
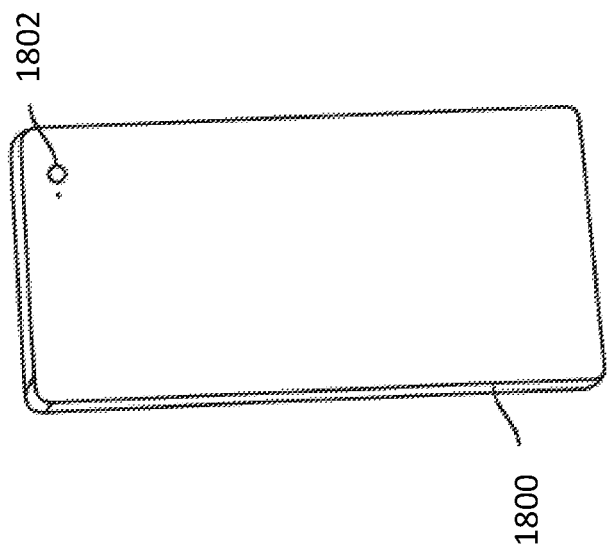
FIG. 18 illustrates a mobile device incorporating an imaging device of the types described herein.

The imaging systems described herein may be used in various applications, some examples of which are described in connection with FIGS. 18-20. A first example is that of a mobile device, such as a smartphone, tablet computer, smartwatch, or other mobile device. The imaging systems of the type described herein, such as the imaging device 100 or system 1800, may be used as a camera component of the mobile device. FIG. 18 illustrates a mobile device 1800 incorporating an imaging device of the types described herein.

The mobile phone 1800 includes a camera 1802 which may be an imaging device of the types described herein for capturing and generating 3D images, such as imaging device 100. The use of imaging device 100 as camera 1802 may be facilitated by low power consumption operation, such as the manners of operation described herein in connection with the imaging devices according to aspects of the present application. Mobile devices, such as mobile phone 1800, typically operate from battery power, and thus components which consume substantial power can be impractical for use within such devices. Imaging devices of the types described herein, by contrast, may be deployed within such devices in a power efficient manner.

Figure 19:
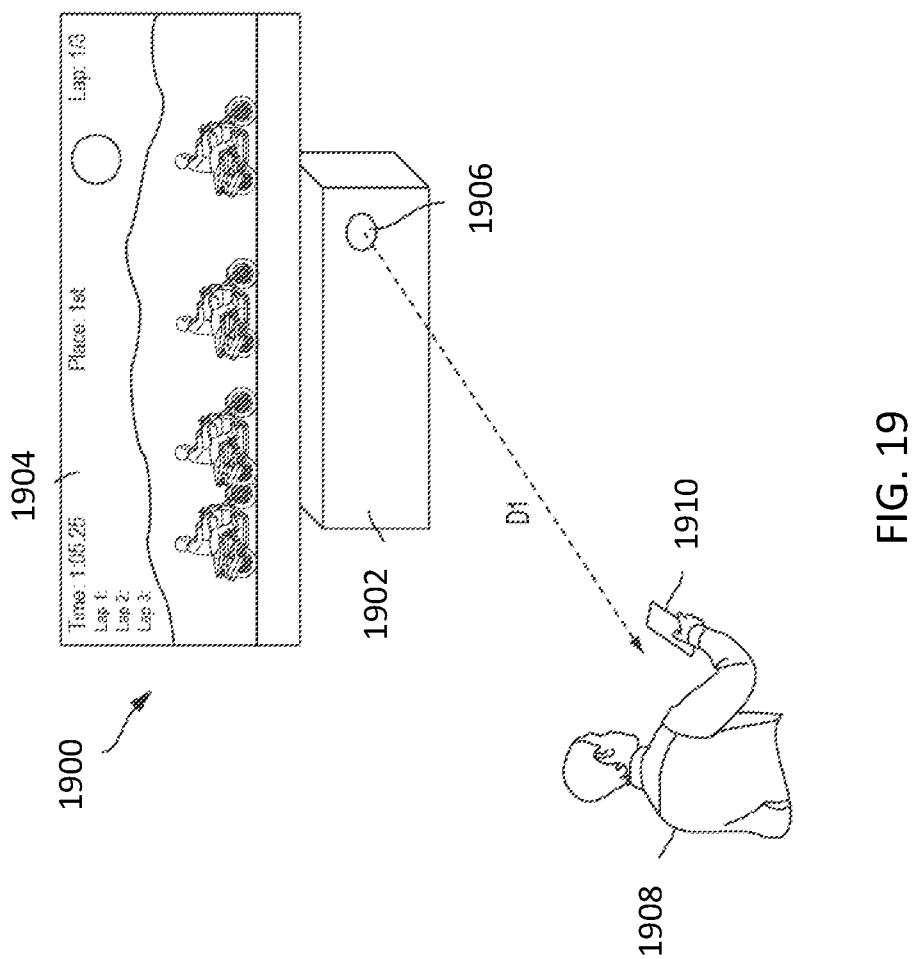
FIG. 19 illustrates a gaming console incorporating an imaging device of the types described herein.

FIG. 19 illustrates an entertainment system 1900 implementing an imaging system of the types described herein. The entertainment system 1900 includes a console 1902 and display 1904. The console may be a video gaming console configured to generate images of a video game on the display 1104, and may include a camera 1906. The camera 1906 may be an imaging system of the types described herein configured to capture 3D images, such as imaging device 100. In the example of FIG. 19, a user 1908 may interact with the entertainment system via a controller 1910, for example to play a video game. The camera 1906 may capture images of the user and/or controller, and may determine a distance D1 to the user. The distance information may be used to generate a 3D image for display on the display 1904 or for control of some other aspect of the entertainment system. For example, the user 1902 may control the entertainment system with hand gestures, and the gestures may be determined at least in part through capturing distance information D1.

Imaging systems of the types described herein may also be employed in robotics. FIG. 20 illustrates an example of a robot 2002 with an imaging system 2004. The robot may be mobile and the information collected by imaging system 2004 may be used to assist in navigation and/or motor control of the robot. The imaging system 2004 may be of the types described herein, for example being the system or imaging device 100. Mobile robots are typically powered by batteries, and thus imaging systems of the types described herein which may operate at relatively low power according to at least some of the described embodiments may facilitate their integration with the robot.

Figure 20:
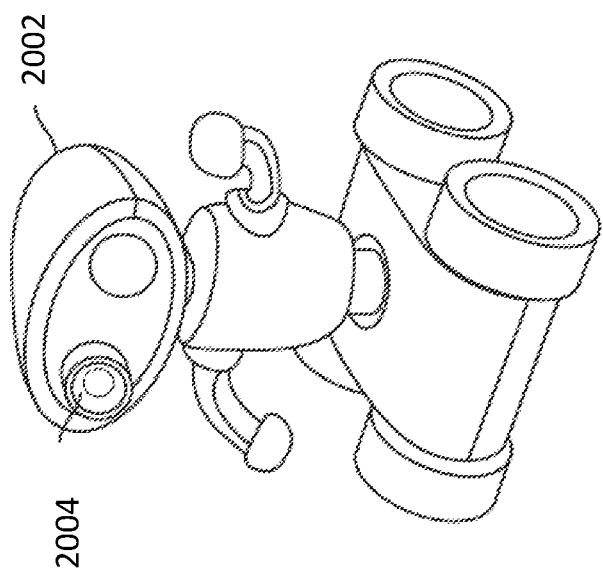
FIG. 20 illustrates a robot incorporating an imaging device of the types described herein.

Examples of uses of the technology described herein beyond those shown in FIGS. 19-20 are also possible. For example, automobiles and security cameras may implement 3D imaging devices of the types described herein.

The phrase "and/or," as used herein in the specification and in the claims, should be understood to mean "either or both" of the elements so conjoined, i.e., elements that are conjunctively present in some cases and disjunctively present in other cases. The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Using Time-of-Flight Depth Sensing with Optimized Time-Varying Light Intensity

A large source of energy consumption for depth sensing using time-of-flight cameras comes from powering the laser(s) that illuminates the scene. To get high signal-to-noise ratio (SNR), the camera sensor is exposed to sufficient amount of light, which currently typically restricts time of flight sensing to plugged-in devices. Many applications require a battery powered solution, such as drone sensing, augmented reality, automotive sensing.

To reduce power consumption with minimal loss in depth image accuracy, this disclosure describes machine learning and computer vision algorithms to enhance low quality depth images obtained from a time-of-flight camera using a low power light source (i.e. by sending fewer light pulses for a given frame). The idea of using low quality depth images obtained from a low power setting to obtain higher quality depth images as if they were collected in a high-power setting by using machine learning techniques is a subset of the more general idea of using machine learning techniques to map data obtained with limited resources (e.g., power, exposure time, pixel count) to data obtained with more abundant resources. One other example is to map low SNR images to what might have been recorded as a high SNR image. Since restriction of such resources probably exhibits itself in a systematic way in the data obtained with limited resources, a data-driven/machine learning approach has the potential to successfully model and compensate such differences if there is enough training data.

To obtain a high-quality depth map, embodiments include using time-insensitive frames (e.g., RGB frames) alongside low quality depth images. As an example, the power consumption of RGB camera is less than the power consumption for laser-based capture of depth images, and the RGB frames can be used to increase the resolution of the depth sensing. Such a system is trained in a data-driven approach such as by a neural net trained to predict the high-quality depth map of the current frame given the current RGB image and a low-quality depth map. To further save power, the system is also trained to output a confidence score that reflects how accurately it can predict the depth in the current frame using the current RGB image and previous depth estimates. When the confidence score is low, such a system can turn on a laser (or other illumination source) and/or use fewer pulses to obtain a low-quality depth map. This low-quality depth map can be used with the RGB image to obtain a higher quality depth map.

In embodiments, the imaging device can take measurements from a scene using the imaging sensor. The term "measurements" can include capturing two-dimensional images and depth images (e.g., depth information that can be used to construct a depth map). The term "two dimensional images" includes any images that are not depth images, such as color (RGB) images, greyscale images, infrared images, other conventional images, etc.

Various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) or a computer readable storage device (which may include the foregoing examples) encoded with one or more programs that, when executed on one or more computers or other processors, implement some of the various embodiments of the present application.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be open-ended, i.e., to mean including but not limited to. The transitional phrases "consisting of" and "consisting essentially of" shall be closed or semi-closed transitional phrases, respectively.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods. In this respect, various inventive concepts may be embodied as a computer readable storage medium or multiple computer readable storage media (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. An image processing system having on-the-fly calibration, comprising:
    a light source configured to emit light;
    a sensor array comprising a plurality of pixels for receiving incoming signals including reflected emitted light, wherein for each of the plurality of pixels, the sensor array includes a storage unit for storing collected received incoming signals;
    a mobile obstruction positioned at a predetermined distance from the light source, configured to reflect at least a portion of the emitted light from the light source to at least a subset of the pixels in the sensor array, wherein the obstruction is a shutter configurable to cover the light source and the sensor array; and
    a processor configured to determine a distance measurement for at least one of the pixels in the subset of pixels and to use the predetermined distance of the obstruction to calibrate the image processing system.

2. The image processing system of claim 1, wherein a first subset of the storage units corresponds to the subset of the pixels, and wherein the first subset of storage units stores collected signals comprising emitted light reflected off the obstruction.

3. The image processing system of claim 1, wherein the predetermined distance is less than about ten millimeters.

4. The image processing system of claim 1, further comprising a light block positioned between the light source and the sensor array, wherein the light block is configured to prevent emitted light from travelling directly to the sensor array.

5. The image processing system of claim 1, wherein the subset of pixels receive less than a saturation amount of reflected light.

6. The image processing system of claim 1, wherein the light source emits light over a tunable solid angle.

7. The image processing system of claim 6, further comprising a diffuser configured for moveable placement in front of the light source.

8. A method for calibrating an image processing system, comprising:
    emitting light from a light source;
    receiving reflected emitted light at a sensor array having a plurality of pixels wherein receiving reflected emitted light comprises receiving emitted light reflected off an integrated moveable obstruction positioned at a predetermined distance from the light source, wherein the moveable obstruction is a shutter configurable to cover the light source and the sensor array;
    collecting and storing incoming signals at the plurality of pixels in a corresponding plurality of storage units;
    determining a depth measurement for at least a subset of the plurality of pixels from signals stored in a corresponding subset of the storage units; and
    calibrating the system using the depth measurement and the predetermined distance of the obstruction.

9. The method of claim 8, wherein calibrating the system further includes comparing the depth measurement with the predetermined distance.

10. The method of claim 8, wherein calibrating the system comprises using the subset of storage units that receive less than a saturation amount of reflected light.

11. The method of claim 8, wherein emitting light includes emitting light over a tunable solid angle.

12. The method of claim 8, wherein receiving emitted light reflected off the integrated obstruction includes receiving emitted light reflected off the shutter when the shutter is in a first position.

13. The method of claim 12, further comprising disposing an adjustable aperture in the shutter in front of the light source.

14. An image processing system having on-the-fly calibration, comprising:
    a light source configured to emit light;
    a sensor array comprising a plurality of pixels for receiving incoming signals including reflected emitted light, wherein for each of the plurality of pixels, the sensor array includes a storage unit for storing collected received incoming signals;
    a shutter positioned at a predetermined distance from the light source configurable to cover the light source and the sensor array; and
    a processor configured to calibrate the image processing system using the predetermined distance and stored collected signals from at least a subset of the storage units, wherein the processor determines a distance measurement for at least one of the plurality of pixels.

15. The image processing system of claim 14, further comprising a diffuser configured for moveable placement in front of the light source.

16. The image processing system of claim 14, further comprising a light block positioned between the light source and the sensor array, wherein the light block is configured to prevent emitted light from travelling directly to the sensor array.

17. The image processing system of claim 1, wherein the shutter includes an adjustable aperture.

18. The image processing system of claim 1, wherein the shutter includes multiple shutter elements.

19. The image processing system of claim 14, wherein the subset of the storage units stores collected signals comprising emitted light reflected off the shutter.

20. The image processing system of claim 14, wherein the shutter includes multiple shutter elements.

\* \* \* \* \*